(12) United States Patent
Gueritee et al.

(10) Patent No.: US 10,721,977 B2
(45) Date of Patent: Jul. 28, 2020

(54) TEMPERATURE REGULATING SYSTEM

(71) Applicant: Clim8 Limited, Hong Kong (CN)

(72) Inventors: Julien Gilles Gueritee, Hong Kong (CN); Florian Patrick Paul Miguet, Hong Kong (CN); Pierre Mouette, Hong Kong (CN)

(73) Assignee: CLIM8, Venissieux (FR)

( * ) Notice: Subject to any disclaimer, the term of this patent is extended or adjusted under 35 U.S.C. 154(b) by 148 days.

(21) Appl. No.: 15/759,867

(22) PCT Filed: Mar. 21, 2017

(86) PCT No.: PCT/CN2017/077449
§ 371 (c)(1),
(2) Date: Mar. 14, 2018

(87) PCT Pub. No.: WO2017/162131
PCT Pub. Date: Sep. 28, 2017

(65) Prior Publication Data
US 2018/0255847 A1 Sep. 13, 2018

(30) Foreign Application Priority Data
Mar. 21, 2016 (HK) .................................. 16103267

(51) Int. Cl.
*A41D 13/005* (2006.01)
*G05D 23/19* (2006.01)
(Continued)

(52) U.S. Cl.
CPC ... *A41D 13/0051* (2013.01); *A41D 19/01535* (2013.01); *G05D 23/1934* (2013.01);
(Continued)

(58) Field of Classification Search
CPC .......... H05B 1/02; H05B 1/0272; H05B 3/34; H05B 3/342; H05B 2203/036
(Continued)

(56) References Cited
U.S. PATENT DOCUMENTS
2012/0305231 A1 12/2012 Liang et al.
2015/0230524 A1* 8/2015 Stevens .................... H05B 3/34
219/211

FOREIGN PATENT DOCUMENTS
CN 2686269 Y 3/2005
CN 202314973 U 7/2012
(Continued)

Primary Examiner — Phuong T Nguyen
(74) Attorney, Agent, or Firm — Renner Kenner Greive Bobak Taylor & Weber

(57) ABSTRACT

A temperature regulation system for regulating the temperature of a body includes at least one temperature sensor adapted to generate a temperature measurement that relates to a temperature of a given portion of a body, at least one flexible support to be directly or indirectly positioned against or in proximity of a given portion of the body, at least one temperature adjustment element adapted to provide heat and/or cold to a given portion of the body, arranged on or in the flexible support, a memory unit adapted to store at least one temperature related threshold value, a logical unit in wire or wireless communication with the memory unit and adapted to perform logical processing, a controlling unit in wire or wireless communication with the logical unit, with the temperature sensor and with the temperature adjustment element.

29 Claims, 12 Drawing Sheets

Figure 1:
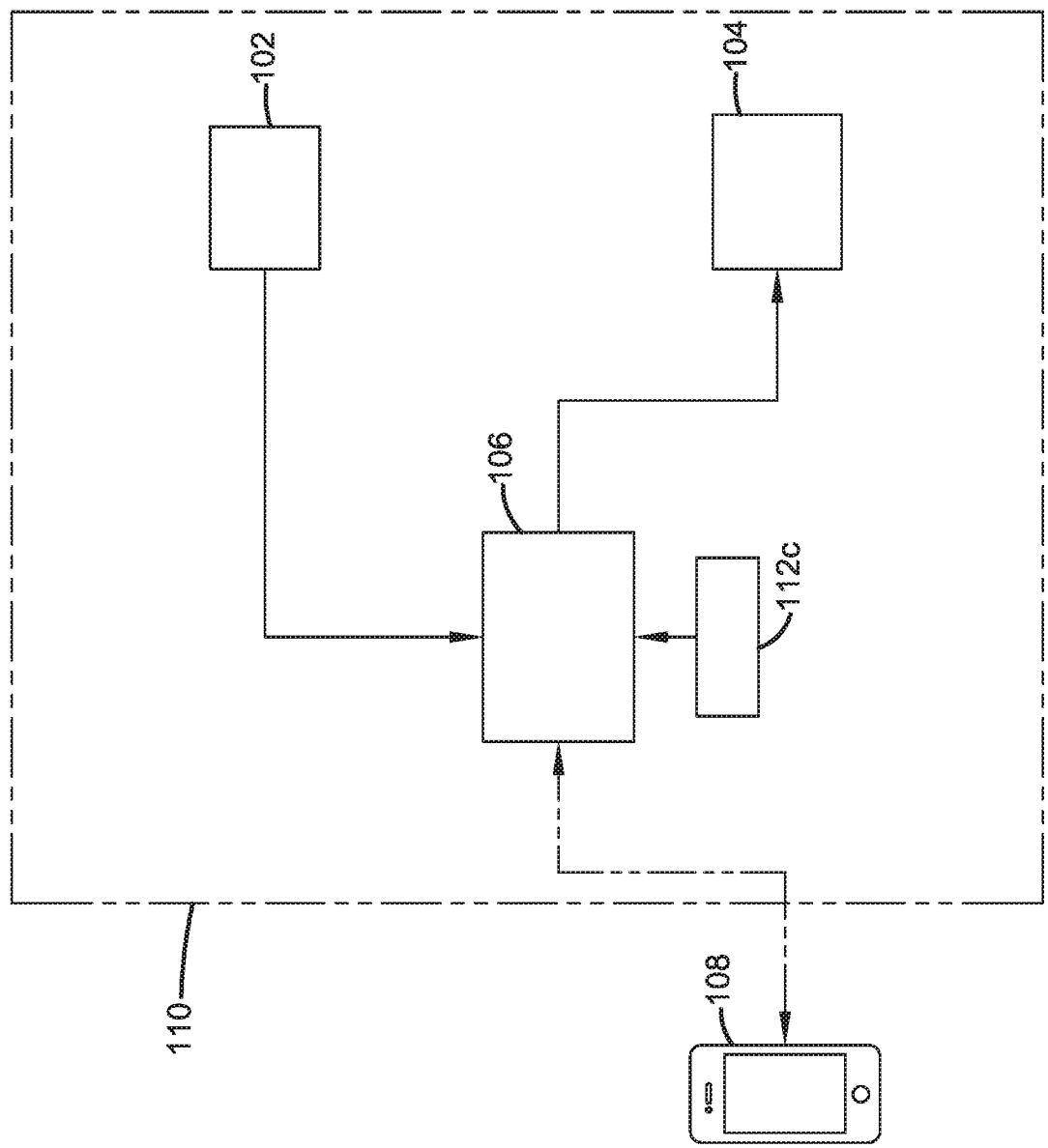

(51) Int. Cl.
*H05B 3/34* (2006.01)
*H05B 1/02* (2006.01)
*A41D 19/015* (2006.01)

(52) U.S. Cl.
CPC ............. *H05B 1/0272* (2013.01); *H05B 3/34* (2013.01); *H05B 3/342* (2013.01); *H05B 2203/036* (2013.01)

(58) Field of Classification Search
USPC ....... 219/211, 217, 483, 494, 506, 541, 528, 219/529
See application file for complete search history.

(56) References Cited

FOREIGN PATENT DOCUMENTS

| | | |
|---|---|---|
| CN | 103231790 A | 8/2013 |
| CN | 203735896 U | 7/2014 |
| CN | 104633860 A | 5/2015 |
| CN | 105054339 A | 11/2015 |

* cited by examiner

TEMPERATURE REGULATING SYSTEM

FIELD OF THE INVENTION

The present invention relates to a temperature regulation system for regulating the temperature of a portion of a body, in particular of a user's body.

BACKGROUND OF THE INVENTION

Thermal comfort is driven by the temperature inside a person's body and the temperature at the surface of your body. Deep body temperature of a person is generally 37° C. and the mean skin temperature of a person is generally 33° C. People become uncomfortable in a thermal sense when the environment changes for example, increased wind or extra sunny day, or when a person moves to a cooler place. In common situations, discomfort in a thermal sense is felt by a user when the user's skin temperature changes, rather than a change in core body temperature.

Conventional chemical or electric heating systems used in clothing can easily deliver heat at relatively high levels. Most currently available devices consist of a wearable garment with heating pads that can be manually adjusted by the user. In at least some devices the heating pads produce an equal heat output and all the heating pads are activated to provide heat. Existing products are often bulky, heavy, require manual operation and are limited in their range of operation

SUMMARY OF THE INVENTION

The invention aims therefore at solving the above mentioned problems, amongst other problems.

To this end, the invention proposes temperature regulated system that allows regulation of the temperature of a portion of a body based on automatic initial temperature measurement during a calibration process without user's intervention.

According to a first aspect, the object of the invention is a temperature regulation system for regulating the temperature of a body, that comprises at least one temperature sensor adapted to generate a temperature measurement that relates to a temperature of a given portion of a body.

The system further comprises at least one flexible support to be directly or indirectly positioned against or in proximity of a given portion of the body, and at least one temperature adjustment element adapted to provide heat and/or cold to a given portion of the body, arranged on or in the flexible support.

The system comprises further again a memory unit adapted to store at least one temperature related threshold value, a logical unit in wire or wireless communication with the memory unit and adapted to perform logical processing, and a controlling unit The controlling unit can be in wire or wireless communication with the memory unit, and is in wire or wireless communication with the logical unit, with the temperature sensor, and with the temperature adjustment element.

The controlling unit is configured to receive the instant temperature of a given portion of the body from the temperature sensor and to transmit it to the logical unit, to receive from the logical unit a result of comparison between at least one instant temperature related value and the temperature related threshold value performed by the logical unit, and to activate the temperature adjustment element to provide heat or cold to a given portion of the body when the result of comparison is such that the instant temperature related value is equal or below, respectively equal or above, the temperature related threshold value.

The controlling unit is further configured to receive one or more reference temperatures of a given portion of the body measured by the temperature sensor prior to receiving the instant temperature, and to transmit said reference temperature to the logical unit, and the logical unit is further configured to determine the temperature related threshold value based on said reference temperatures and to store it in the memory unit.

In some embodiments, the system further comprises one or more of the following features, considered alone or according to any technically possible combination:

- the memory unit is part of the controlling unit or of the temperature sensor or of an external portable device;
- the logical unit is part of the controlling unit or of an external portable device;
- the controlling unit is further configured to deactivate the temperature adjustment element when the result of comparison is such that the instant temperature related value is equal or exceeds, respectively is equal or below, the temperature related threshold value;
- the controlling unit is further configured to deactivate the temperature adjustment element after a given of time of working of said temperature adjustment element;
- the system further comprises one or more temperature sensors adapted to generate a temperature measurement that relates to a temperature of other portions of the body, said other temperature sensors being arranged on or in the flexible support or other flexible supports to be directly or indirectly positioned against or in proximity of the other portions of the body, the controlling unit being further configured to receive one or more other reference temperatures of the other portions of the body measured by the other temperature sensor and to transmit said reference temperatures to the logical unit, the logical unit being further configured to determine the temperature related threshold value or a temperature related threshold value for each of the given and other portions of the body, based on said reference temperatures and to store them in the memory unit, the controlling unit being also configured to receive the instant temperature of said other portion of the body from said other temperature sensor and to transmit it to the logical unit, to receive from the logical unit a result of comparison between an instant temperature related value, related to the instant temperature of the other portion of the body, and the temperature related threshold value, or other temperature related threshold values, performed by said logical unit, to deactivate the other temperature adjustment element when the result of comparison is such that the instant temperature related value, related to the other portion of the body, is equal or exceeds, respectively equal or below, the temperature related threshold value or the corresponding other temperature related threshold value;
- the body is the body of a human or animal user, and the given portion of the body is one of the wrists of the body of the user;
- the system further comprises a plurality of temperature adjustment elements adapted to provide heat and/or cold to different portions of the body, the controlling unit being in wire or wireless communication with each of the temperature adjustment elements, the logical unit being further configured to determine a corresponding threshold temperature related threshold value associated with each of the different portions of the body based on said reference temperature and to store them in the memory unit, the controlling unit being further configured to receive from the logical unit a result of comparison between the instant temperature related values of each of the different portions of the body and the corresponding temperature related threshold value performed by said logical unit, and to activate a temperature adjustment element amongst the plurality of temperature adjustment elements, to provide heat or cold to the corresponding portion of the body when the instant temperature related value is equal or below, respectively equal or above, the corresponding temperature related threshold value;

the plurality of temperature adjustment elements is arranged on or in the flexible support;

the system further comprises a plurality of flexible supports to be directly or indirectly positioned against or in proximity of a portion of the body, each of the temperature adjustment elements being arranged on or in one of the flexible supports, at least one of the temperature adjustment elements being arranged on or in a flexible support different from the flexible supports which the other temperature adjustment elements are arranged on or in;

the system further comprises a plurality of temperature sensors adapted to generate a temperature measurement that relates to respective temperatures of the different portions of the body, the controlling unit being in wire or wireless communication with each of the temperature sensors and being configured to receive one or more reference temperatures of each of the different portions of the body measured by the corresponding temperature sensors, and transmit said reference temperatures to the logical unit, said logical unit being further configured to determine the corresponding temperature related threshold values based on said respective reference temperatures and to store them in the memory unit, the controlling unit being further configured to receive the respective instant temperatures of the different portions of the body from the respective temperature sensors, to transmit them to the logical unit, to receive from the logical unit results of comparison between each of the instant temperature related values and the corresponding temperature related threshold values performed by said logical unit, to activate the corresponding temperature adjustment element to provide heat or cold to the corresponding portions of the body when corresponding results of comparison are such that the corresponding instant temperatures related values are equal or below, respectively equal or above, the corresponding temperature related threshold values;

the flexible supports are parts of a wearable garment configured to be worn by a human or animal user, the temperature sensors and the temperature adjustment elements being directly or indirectly positioned in an operable position against or in proximity of the skin of a portion of the user's body;

the temperature adjustment elements and or the temperature sensors are positioned such that, in use, at least one of the temperature adjustment elements and/or at least one of the temperature sensors are directly or indirectly against or in proximity of a forearm of the user, and/or in use, at least one of the temperature adjustment element and/or at least one of the temperature sensors are directly or indirectly against or in proximity of an arm of the user, and/or at least one of the temperature adjustment element and/or at least one of the temperature sensors are directly or indirectly against or in proximity of the abdomen of the user, and/or at least one of the temperature adjustment element and/or at least one of the temperature sensors are directly or indirectly against or in proximity of the chest of the user, and/or at least one of the temperature adjustment element and/or at least one of the temperature sensors are directly or indirectly against or in proximity of the back of the user, and/or at least one of the temperature adjustment element and/or at least one of the temperature sensors are directly or indirectly against or in proximity of the thigh of the user, and/or at least one of the temperature adjustment element and/or at least one of the temperature sensors are directly or indirectly against or in proximity of a lower leg of the user, and/or at least one of the temperature adjustment element and/or at least one of the temperature sensors are directly or indirectly against or in proximity of a finger of the user, and/or at least one of the temperature adjustment element and/or at least one of the temperature sensors are directly or indirectly against or in proximity of a hand of the user, and/or at least one of the temperature adjustment element and/or at least one of the temperature sensors are directly or indirectly against or in proximity of the head of the user, and/or at least one of the temperature adjustment element and/or at least one of the temperature sensors are directly or indirectly against or in proximity of the neck of the user, and/or at least one of the temperature adjustment element and/or at least one of the temperature sensors are directly or indirectly against or in proximity of a toe of the user and/or at least one of the temperature adjustment element and/or at least one of the temperature sensors are directly or indirectly against or in proximity of the foot of the user, and/or at least one of the temperature adjustment element and/or at least one of the temperature sensors are directly or indirectly against or in proximity of a shoulder of the user, and/or at least one of the temperature adjustment element and/or at least one of the temperature sensors are directly or indirectly against or in proximity of a lower arm of the user, and/or at least one of the temperature adjustment element and/or at least one of the temperature sensors are directly or indirectly against or in proximity of an upper arm of the user;

the system further comprises at least one environmental sensor that is configured to measure the value of an environmental parameter, the controlling unit being in wire or wireless communication with the environmental sensor, and being configured to receive a measured value of the environmental parameter and to transmit it to the logical unit, said logical unit being configured to adjust the temperature related threshold values based on the value of the environmental parameter;

the system further comprises at least one motion sensor, such as an accelerometer, configured to measure the value of a motion parameter that relates to a motion of the user, the controlling unit being in wire or wireless communication with the motion sensor, and being configured to receive the value of the motion parameter and to transmit it to the logical unit, said logical unit being configured to analyze the user's activity and adjust the temperature related threshold values based on the value of the motion parameter;

the temperature related threshold values are related to the value of the motion parameter, such that the greater the value of the motion parameter the lower the temperature related threshold values;

the controlling unit is further configured to receive the value of at least one user parameter and to transmit it to the logical unit, said logical unit being configured to adjust the temperature related threshold values based on the value of the user parameter;

the user parameter is at least one or more of age, gender, personal thermal sensitivity, body height, body mass, cold habituation/acclimation, acute weakness, time of day, season;

the controlling unit is configured to at least periodically update the temperature related threshold values based on user data;

the controlling unit is configured to at least periodically update the temperature related threshold values based on collected on a group of users;

the controlling unit is configured to communicate wirelessly with an external device;

each of the temperature adjustment elements include a heating element and/or a cooling element;

the system further comprises a power supply for supplying power to the controlling unit and the logical unit;

the power supply is an external power supply;

the controlling unit is configured to receive periodically the temperatures from the temperature sensors, every X minutes, preferably with X less or equal to 5, most preferably with X equal to 1;

the controlling unit and the temperature sensors are configured such that the temperature from each of the temperature sensors is received by the controlling unit in a time lapse of 1 to 5 seconds;

the at least one temperature related threshold value is a threshold temperature, and the at least one instant temperature related value is the instant temperature;

the at least one, or a second, temperature related threshold value is a threshold of rate of change of temperature over a given period of time, and the at least one, or second, instant temperature related value is the rate of change of the instant temperature over said given period of time.

According to a second aspect, the object of the invention is a garment to be worn by a human or animal user comprising a temperature regulation system as presented above, the flexible supports being parts of, or integrated in, the garment.

DRAWINGS

Figure 2:
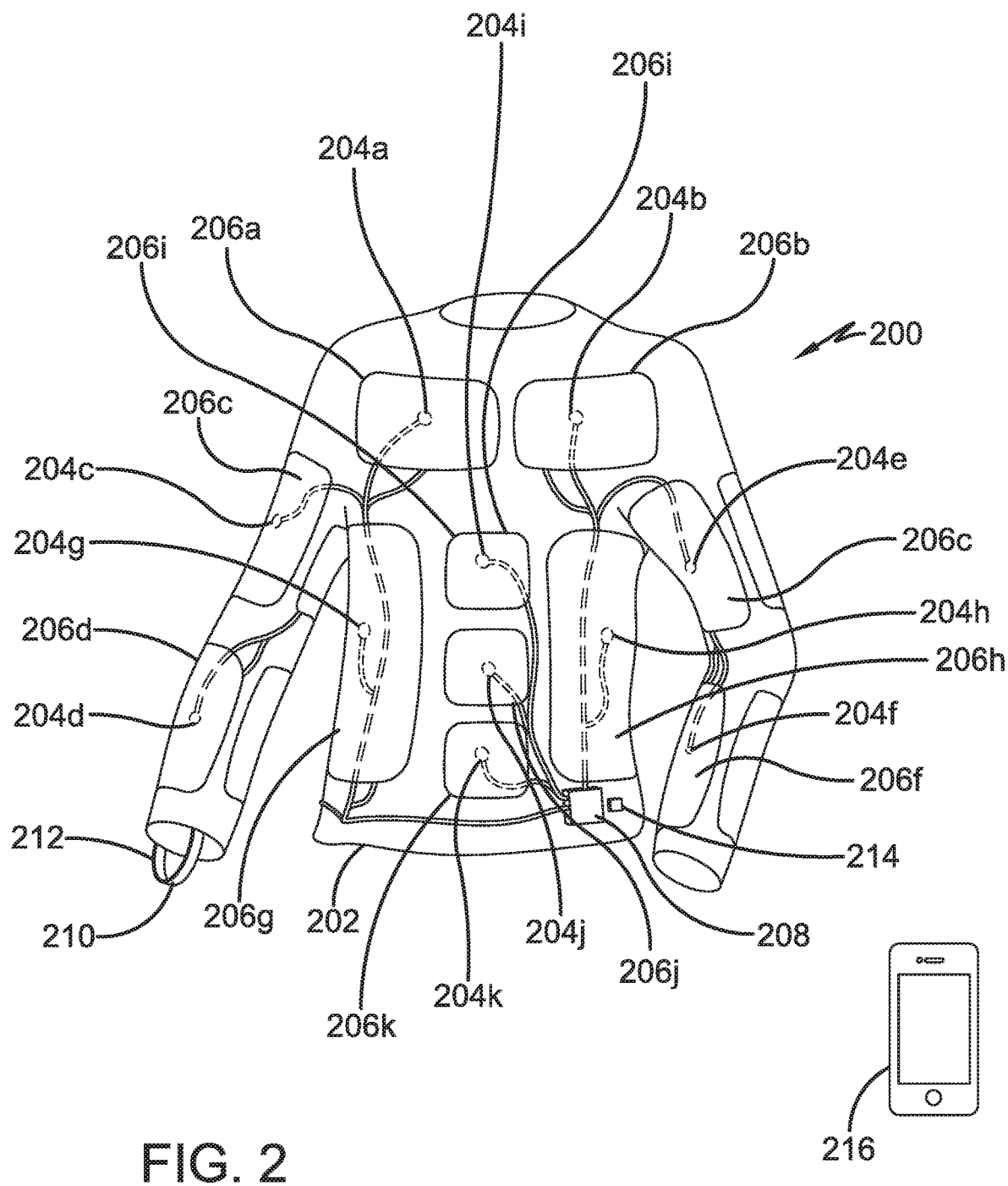
Figure 3:
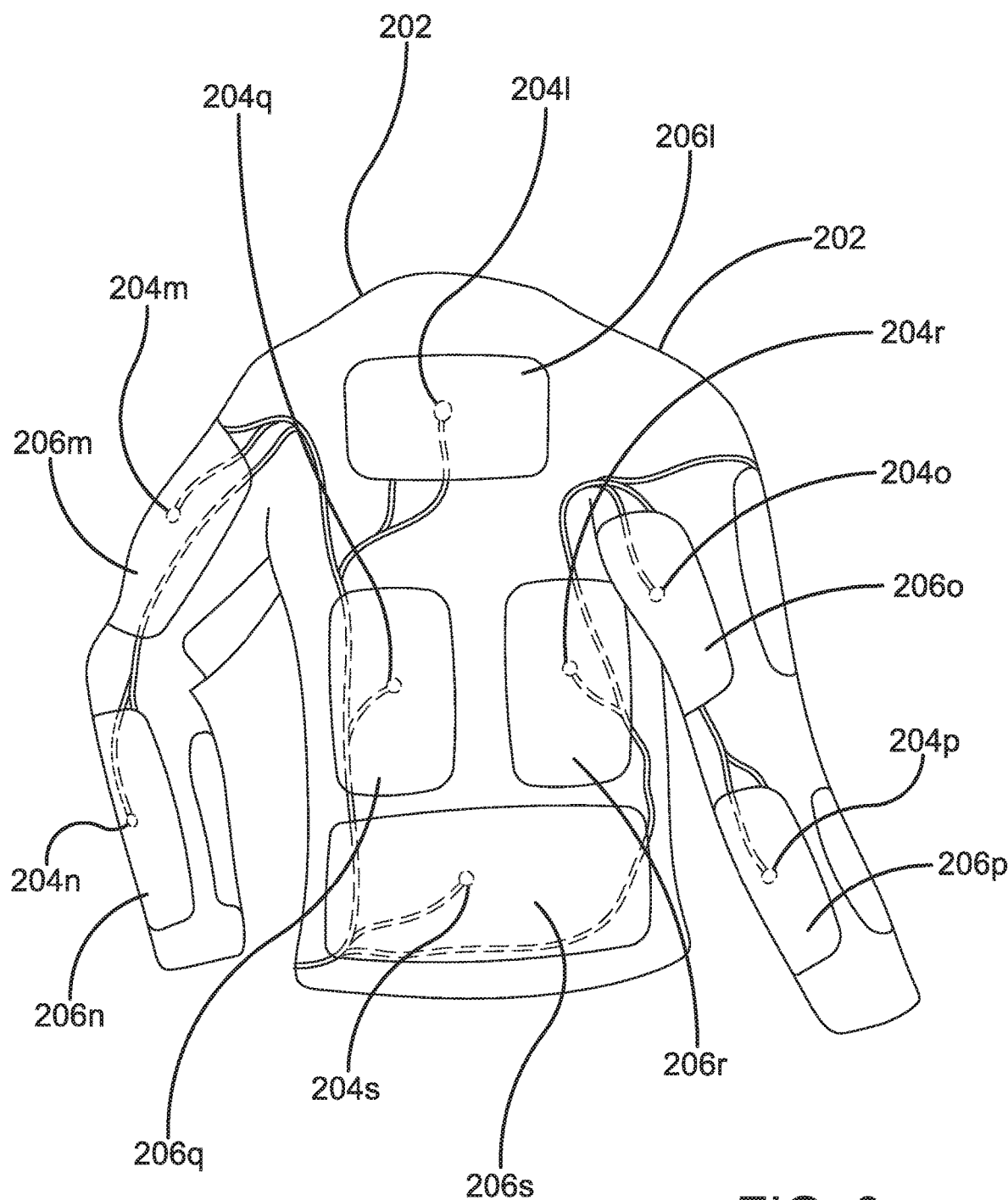
Figure 4:
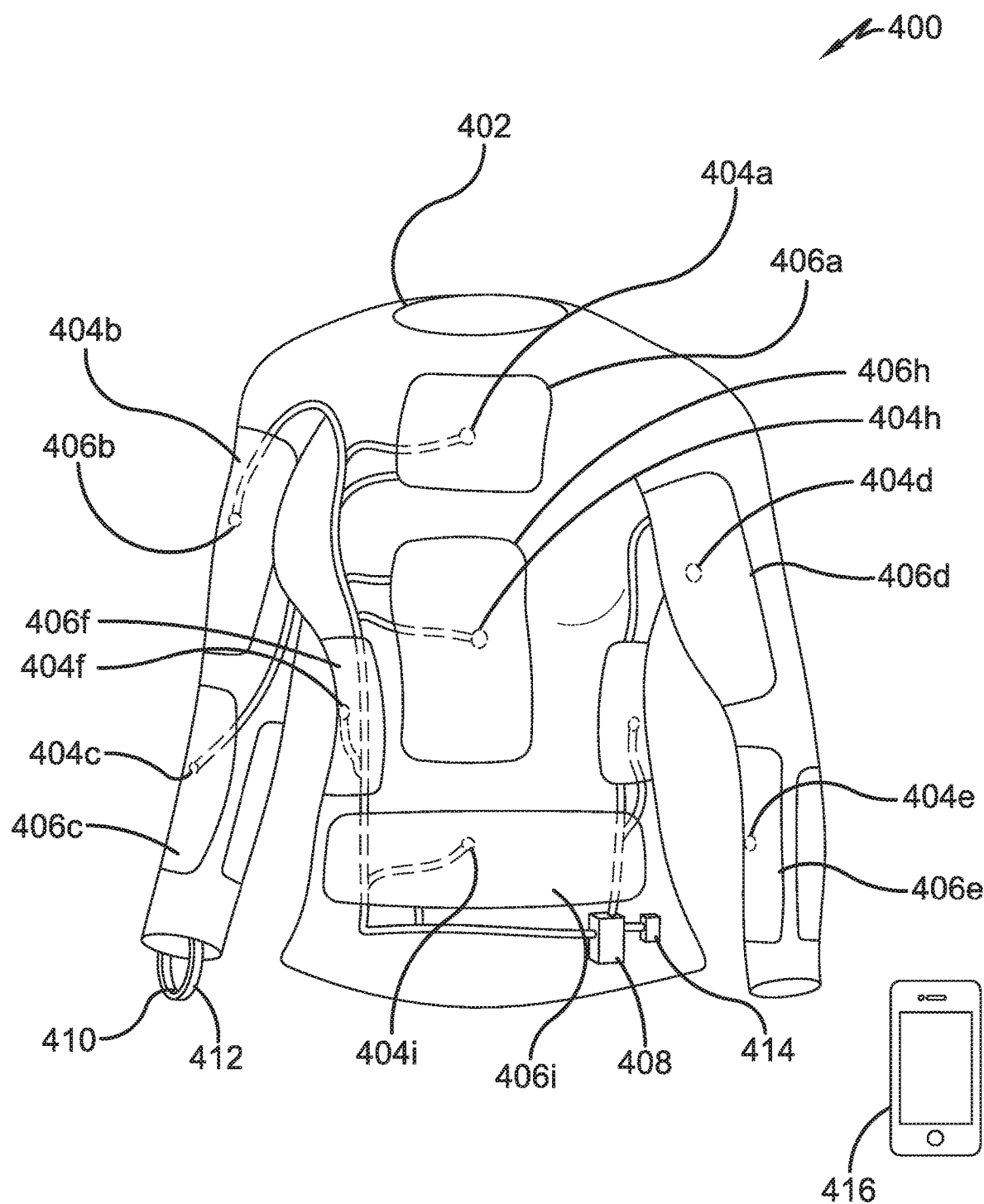
Figure 5:
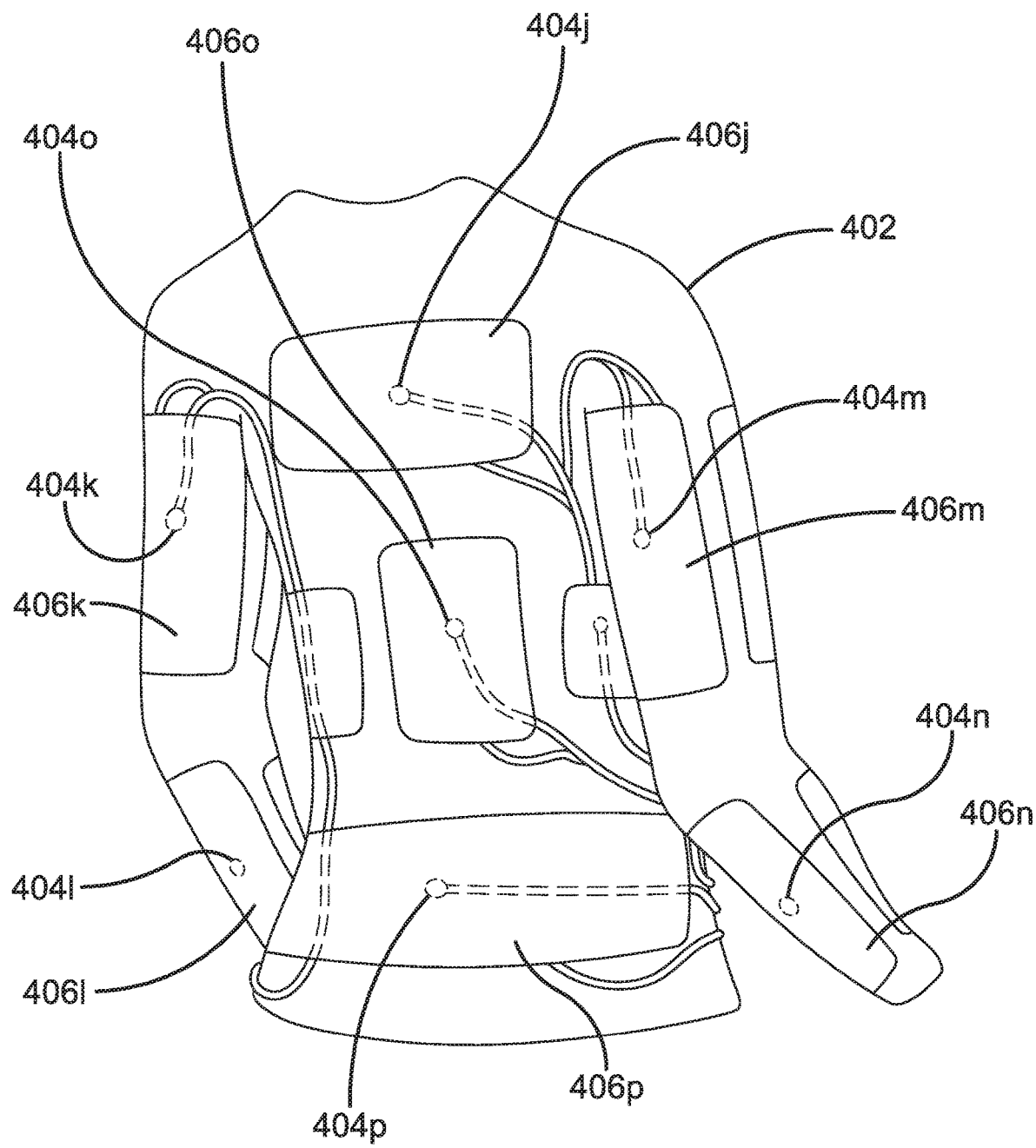
Figure 6:
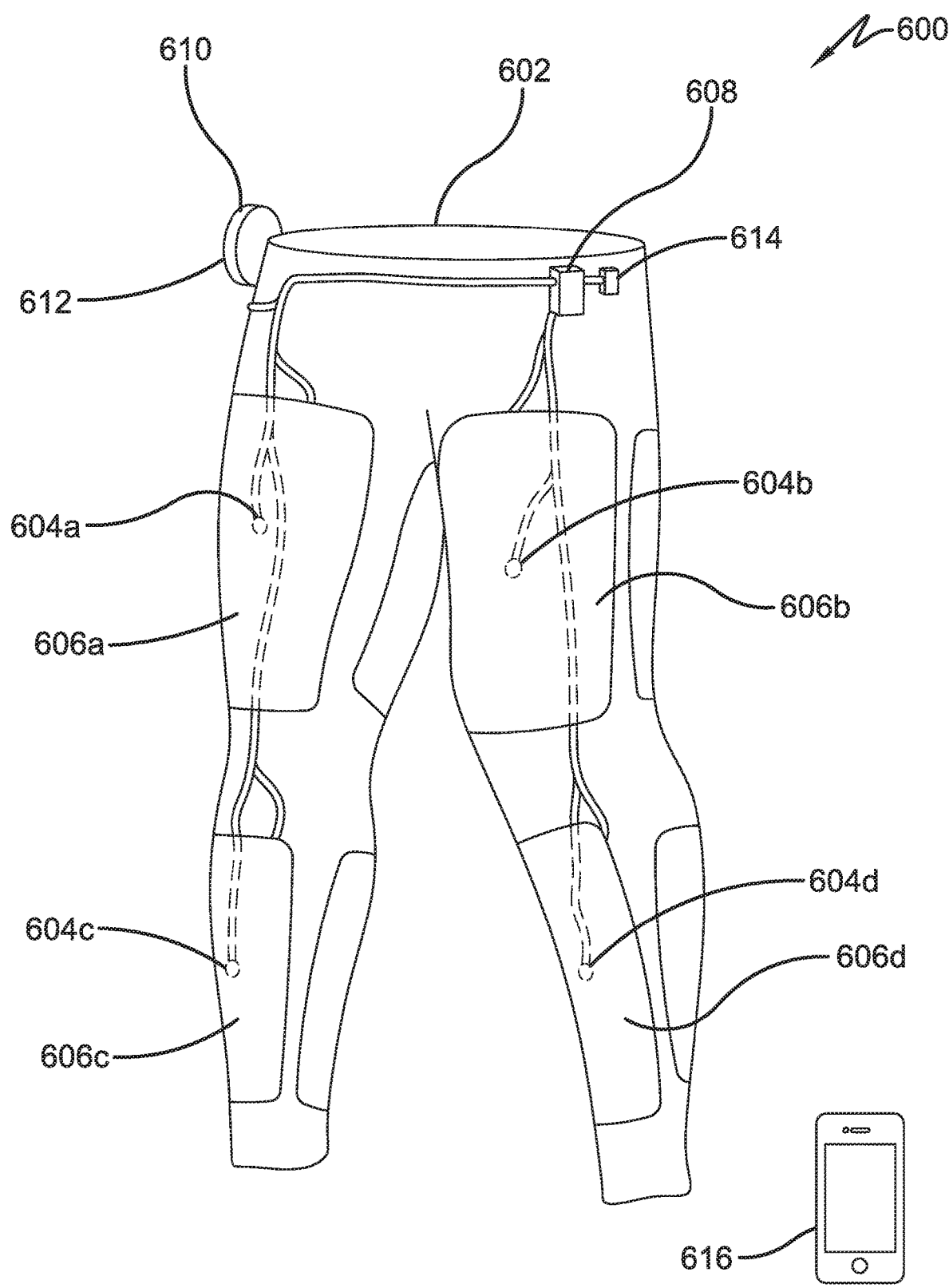
Figure 7:
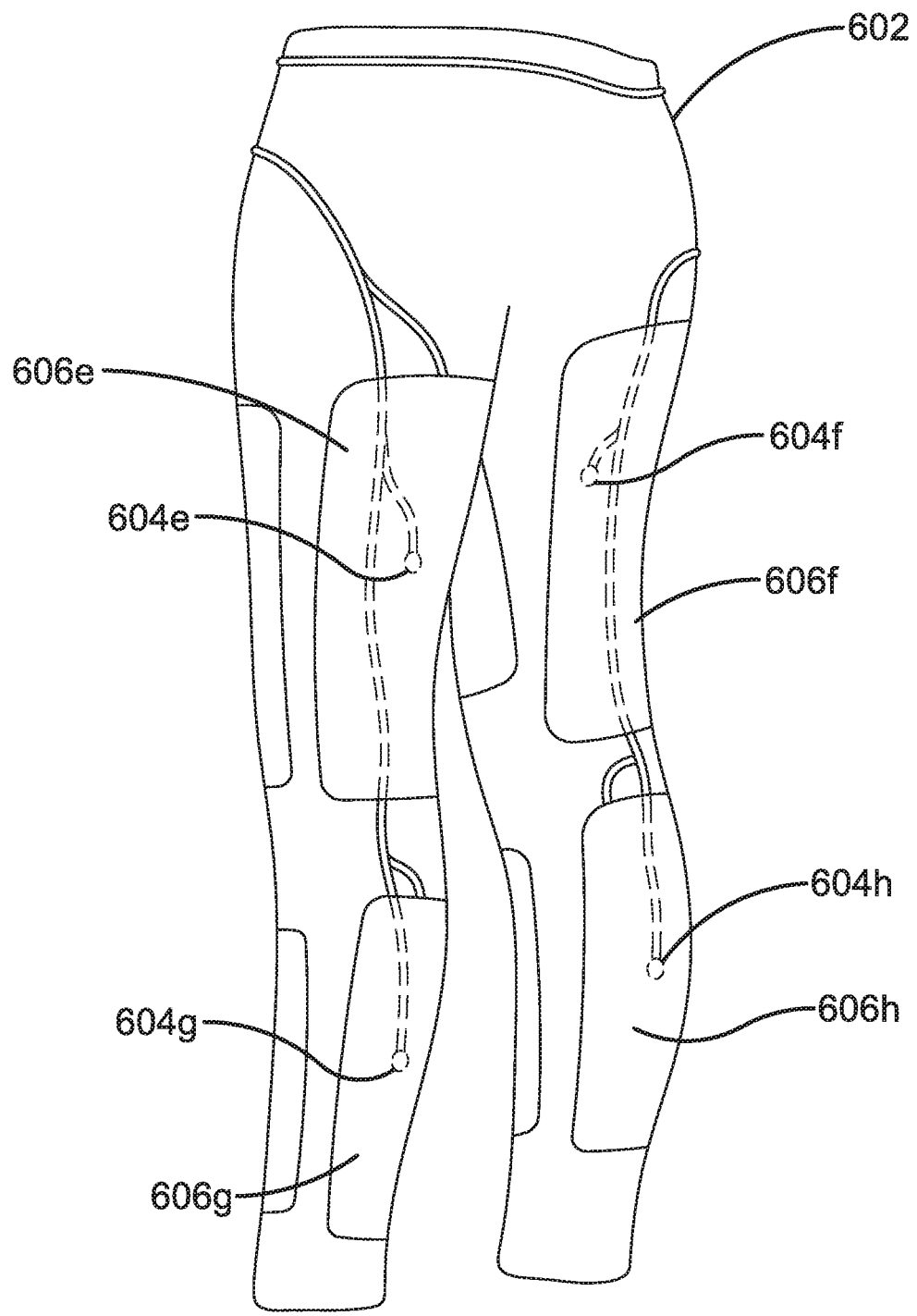
Figure 8:
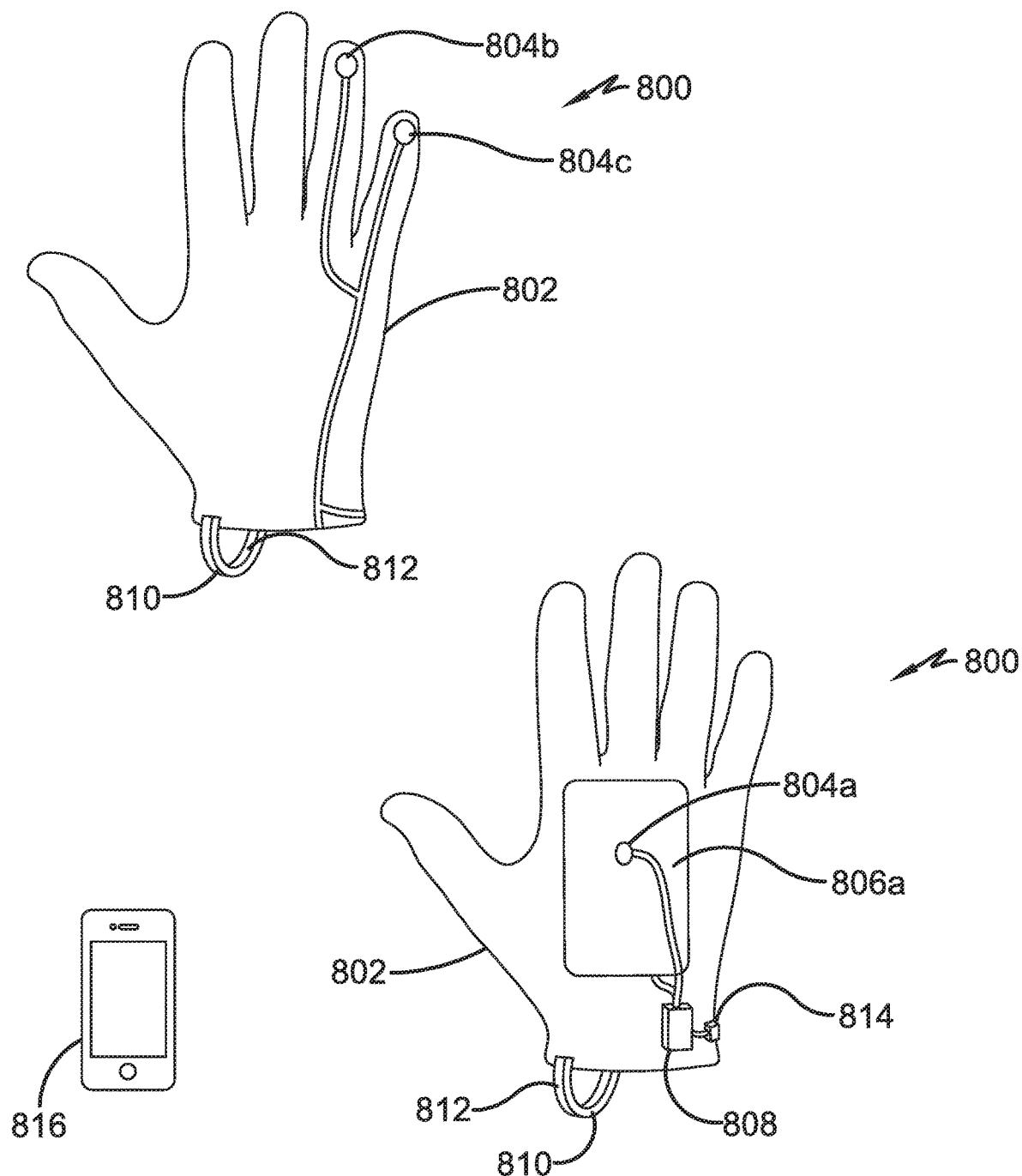
Figure 9:
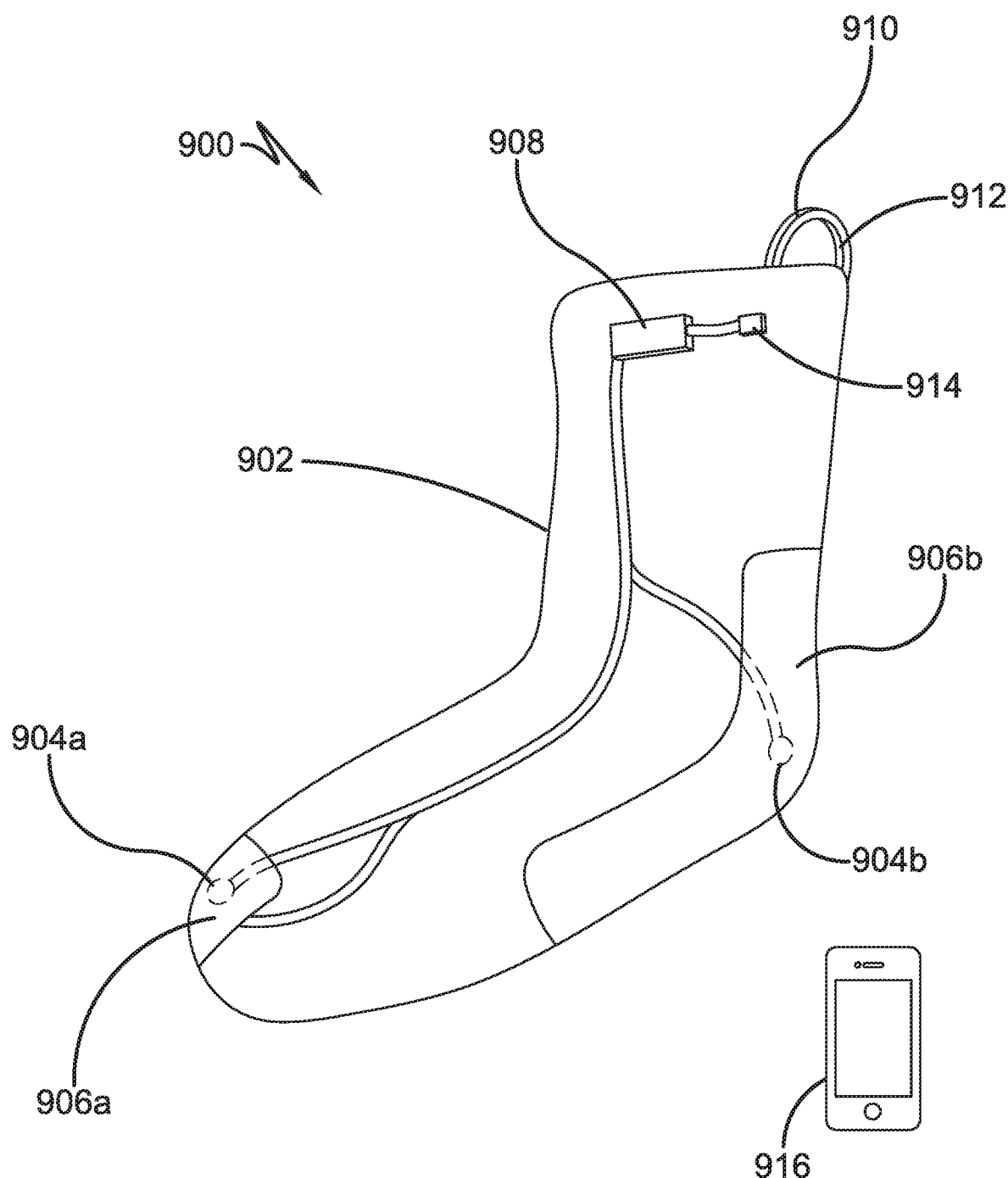
Figure 10:
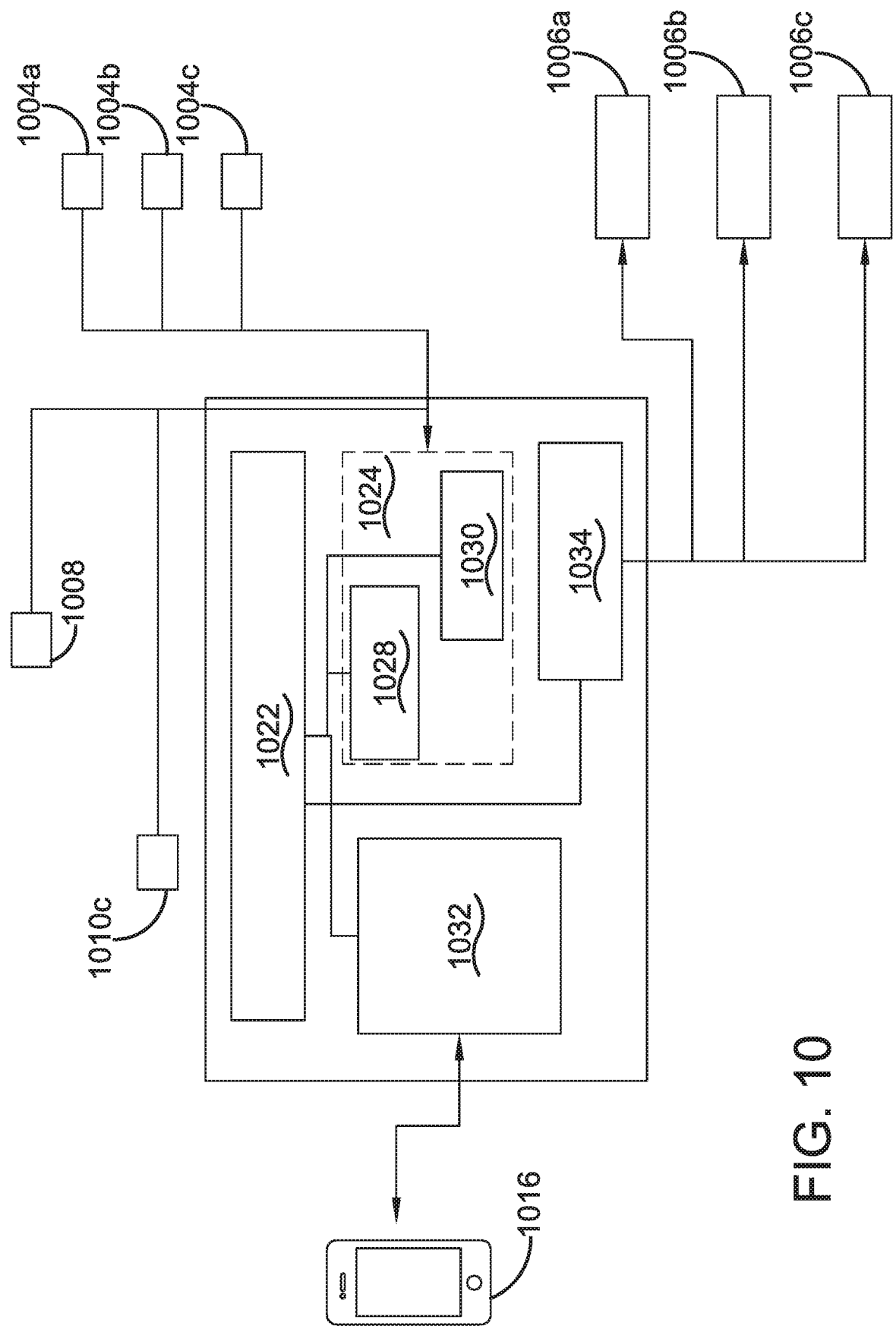
Figure 11:
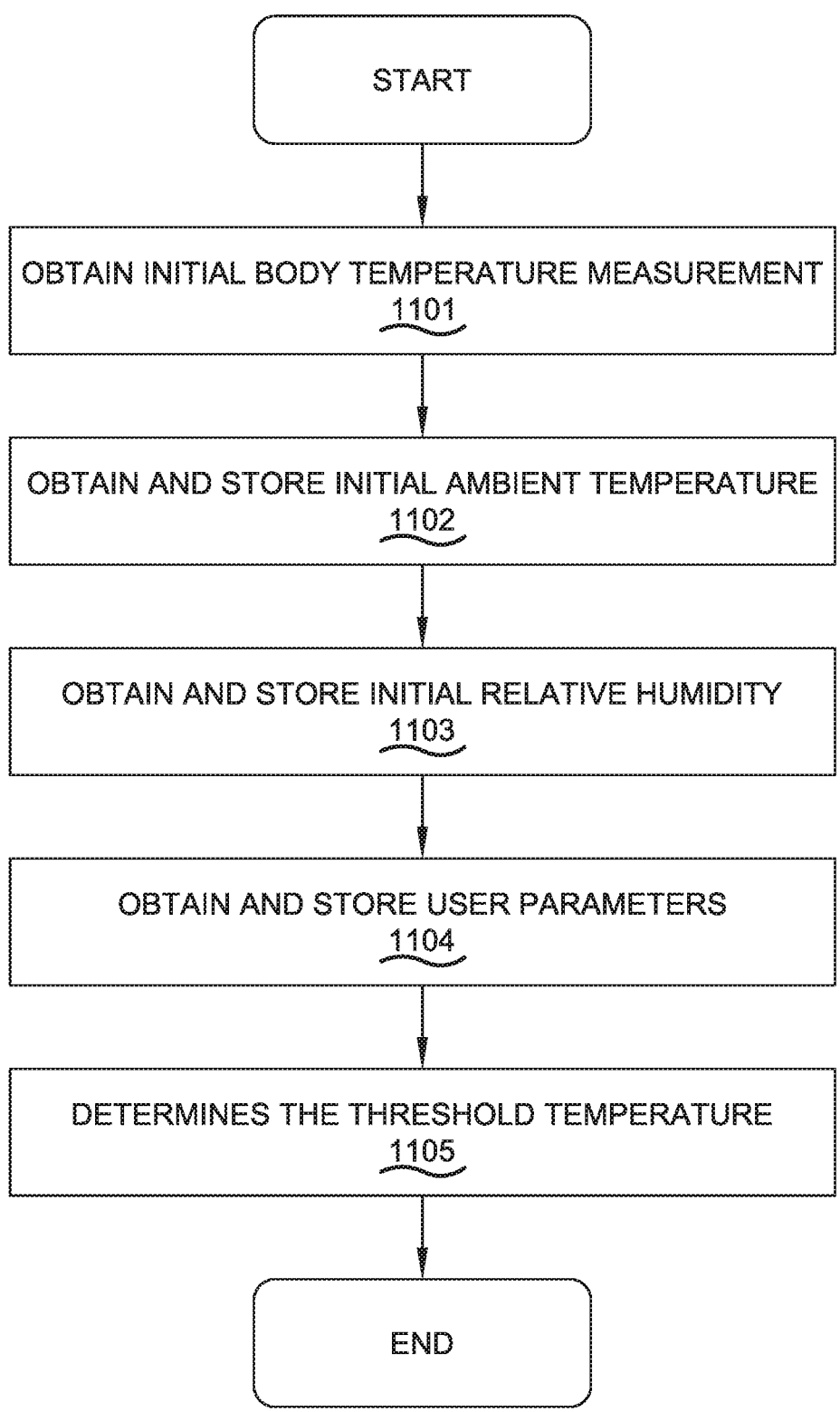

The invention and its advantages may be better understood by referring to the description which follows, given as example and for illustrative purpose only, and by referring to the accompanying drawings listed below:

FIG. 1: shows a generalized temperature regulation system;

FIG. 2: shows a front view of a long sleeve shirt with a temperature regulation system being disposed on the shirt;

FIG. 3: shows a back view of the long sleeve shirt of FIG. 2 and the temperature regulation system disposed on the shirt;

FIG. 4: shows another embodiment of the temperature regulation system being disposed on a long sleeve shirt;

FIG. 5: shows a back view of the shirt of FIG. 4 with a temperature regulation system disposed on the shirt;

FIG. 6: shows an embodiment of a temperature regulation system that is disposed on long pants;

FIG. 7: shows the back of the pants and the temperature regulation system disposed on pants;

FIG. 8: shows a further embodiment of a temperature regulation system that is disposed on a glove;

FIG. 9: shows an embodiment of a temperature regulation system disposed on a sock;

FIG. 10: shows a schematic diagram of a controller that can be used in any embodiment of a temperature regulation system shown in FIGS. 1 to 9;

FIG. 11: shows a flow chart for determining an initial threshold temperature.

Figure 12:
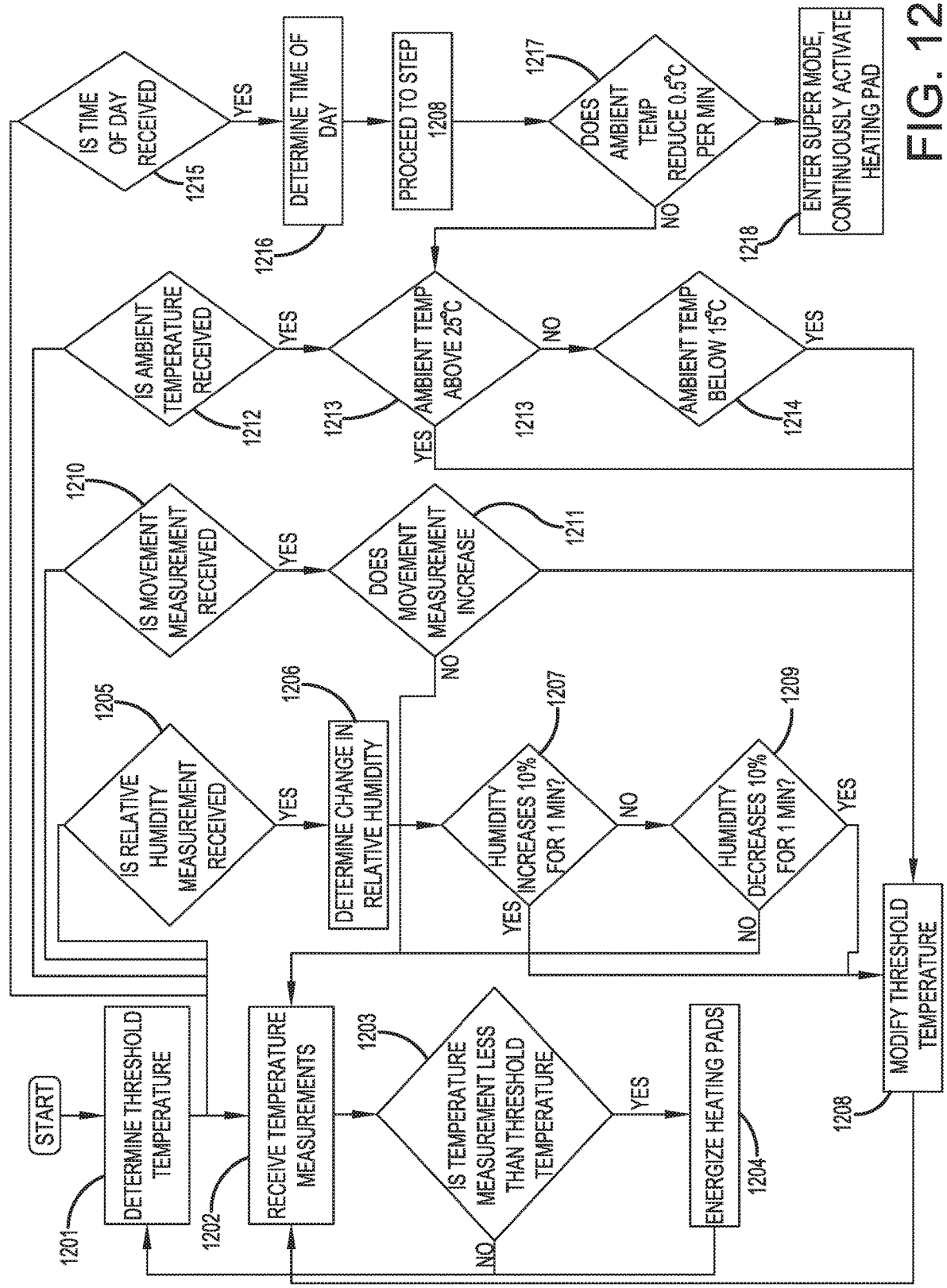

FIG. 12: shows a flow chart of the controller operation to regulate temperature of a user.

DETAILED DESCRIPTION

Various embodiments will be described with reference to the figures.

FIG. 1 shows a schematic of a generalized temperature regulation system. As shown in FIG. 1, the temperature regulation system 100 comprises a temperature sensor 102, a heating element 104, a controller 106 and a user device 108. The system further comprises a flexible support 110 that can be a wearable article 110, or can be integrated in such a wearable article.

As shown in FIG. 1, at least the temperature sensor 102 is disposed on the wearable article such that the temperature sensor 102 is in contact with a portion of the user's body. The temperature sensor 102 is at least directly in contact with the user's skin. Alternatively, the temperature sensor 102 is indirectly in contact with the user's skin, for example through a layer of the wearable garment or article 110. The sensor 102 is configured to measure the skin temperature of the user.

The wearable garment 110 can be any suitable garment 110 that a user can wear on a portion of the user's body. For example the garment 110 can be a long sleeve shirt, T-shirt, hat, socks, gloves, pants, tights, jacket, beanie or any other suitable wearable garment.

The temperature sensor 102 is configured to generate a temperature measurement that corresponds to the temperature at a portion of the user's body. Preferably the temperature measurement is a skin temperature.

The heating element 104 can be any suitable element or device to provide heat to a user. For example, the heating element 104 may be a heating pad that can be positioned on the wearable garment 110 and arranged in direct contact with the user's skin or in contact through a layer of textile, to provide heat to a portion of the user's body. The heating element 104 provides heat to increase the skin temperature of the user. Alternatively, the heating element can be an air conditioning unit in a car or home or can be a smart appliance or a HVAC system of a building or any other suitable device or system to provide heat to a user.

The controller 106, which will be described further in more details in an example in reference to FIG. 10, is configured to receive the temperature measurement from the temperature sensor 102. The controller 106 is in wire or wireless communication with the temperature sensor 102 and the heating element 104. The controller 106 can be connected by an electrical wire or wirelessly with the temperature sensor 102 and the heating element 104. The controller receives the temperature measurement as an electronic signal from the temperature sensor 102. The controller is configured to process the temperature measurement.

The controller is configured to compare a temperature related value, such as the temperature measurement itself and/or the rate of change of temperature, with a corresponding temperature related threshold value, and generate an output. In the case when the temperature related value is the instant temperature measurement itself, the controller 106 activates the heating element 104 if the temperature measurement i.e. the measured temperature of a portion of the user's body is below the threshold temperature. The controller activates the heating element 104 until the temperature measurement exceeds the threshold temperature.

The heating element 104 is deactivated by the controller 106 when the temperature measurement exceeds the threshold temperature. In some other examples, this threshold temperature, may also be a variable with a suitable value that can be used to determine when the heating element 104 (or in some examples, a cooling element) is activated. In this regard, the threshold may be a threshold temperature, although it may also be a score or summation result that is calculated based the parameters measured.

The user device 108 is a portable device that can be used by the user as an input-output interface. The user device 108 is a low energy wireless system. The user device 108 may, for example, be a smartphone or a tablet. The user device 108 is adapted for two-way communication with the controller 106, such that information can be transmitted from the user device 108 to the controller 106 and information can be transmitted from the controller 106 to the user device 108.

The system 100 further comprises a power source 112 that is connected to the controller 106 to power the controller 106. The power source 112 can transmit power via a wired connection or wirelessly. The controller 106 and the power source 112 are preferably disposed on the wearable garment 110.

Alternatively, the power source can be the power source of the user device 108.

FIGS. 2 and 3 illustrate an embodiment of a temperature regulation system 200 for regulating the temperature of a portion of user's body. As shown in FIG. 2, the system comprises a wearable garment 202. In the illustrated embodiment, at least a portion of or components of the temperature regulation system are disposed on the wearable garment 202.

In the embodiment of FIG. 2 the wearable garment 202 is a long sleeve shirt. The long sleeve shirt is tight fitting shirt such as an exercise shirt or a compression shirt. The long sleeve shirt 202 is formed from any suitable natural or artificial textile material. The shirt 202 is made from a blend of artificial textile material such as polyamide, polyester, elastane, spandex or any other fiber that allows good breathability, softness and stretching. Alternatively, the shirt 202 may be made of natural textiles such as wool or cotton.

The wearable garment 202 is formed of one or more layers of textile material. In the embodiment shown in FIGS. 2 and 3, comprises at least two layers of textile. The layers of textile may be separated by an air-gap. The wearable garment 202 may include a plurality of pockets 202a-202p formed between two textile layers. The wearable garment 202 can be different sizes to account for different sized users, and the components of the system can be arranged in a similar manner on various sizes of the garment 202.

The temperature regulation system 200 comprises a plurality of temperature sensors referred to as 204a-204s that are disposed on the wearable garment 202. Each temperature sensor, of the plurality of temperature sensors 204a-204s is configured to generate a temperature measurement. The temperature sensor 204a-204s can be any suitable temperature sensor that can determine a skin temperature measurement such as a thermistor, thermocouple or an infra-red temperature sensor. One example of a temperature sensor is a Smiths Medical skin temperature sensor STS400. The sensors 204a-204s are any suitable size that allow for a low size profile such that the sensor is not uncomfortable when the garment 202 is worn by the user. The sensors are preferably flat disk shaped sensors that are circular or square in shape. The sensors have a diameter of 1 cm or are 1 cm×1 cm in dimension. The sensors can be any other suitable shape. The sensors 204a-204s are configured to measure the skin temperature of the user.

The plurality of temperature sensors 204a-204s measures the temperature at various locations or of various parts of a user's body. Each temperature measurement relates to the temperature of the portion of the user's body that is adjacent to the temperature sensor. The plurality of temperature sensors 204a-204s allow for an accurate representation of the user's body temperature. The use of a plurality of temperature sensors 204a-204s provides a representation of the temperature gradient along a user's body.

The temperature regulation system 200 comprises a plurality of heating elements 206a-206s. As shown in FIG. 2 and FIG. 3, the temperature regulation system 200 comprises fifteen heating elements disposed on the wearable garment 202. Each heating element is a flexible, planar heating pad. Each heating pad 206a-206s is disposed on the wearable garment 202 and is in contact with the user's skin. Each heating pad 206a-206s is positioned within a pocket 202a-202s of the wearable garment 202, such that the heating pad is not in direct contact with the user's skin. Each heating pad 206a-206s is arranged in the pocket such that there is a layer of textile between the heating pad and the user's skin. Alternatively, the heating pad 206a-206s is arranged on the wearable garment 202 and is in direct contact with the skin of the user.

The heating pads 206a-206s are electrically activated heating pads. The heating pads 206a-206s include a heating element wrapped in a soft flexible coating (not illustrated). The heating pad element can be made in any suitable form. The flexible coating is also formed from a suitable biocompatible material such as silicone or a plastics material that is suitable for use on human skin and is also substantially flexible. The coating may be over molded onto the heating element or alternatively the coating is applied to the heating element with any suitable process.

Some of the heating pads 206a-206s are square and planar in shape. Other pads are rectangular in shape. As shown in FIGS. 2 and 3, the square heating pads 206a-206s are 10 cm×10 cm in dimensions and rectangular heating pads are 10 cm×30 cm. Alternatively the heating pads 206a-206s may be any other suitable polygon shape such as a pentagon shape or hexagon shape. The heating pads can be any suitable size and shape depending on the size of the wearable garment.

Each temperature sensor from the plurality of temperature sensors 204a-204s is positioned on a heating pad of the plurality of heating pads 206a-206s. In the embodiment of FIGS. 2 and 3 each temperature sensor 204a-204s is associated with a single heating pad 206a-206s. The temperature sensor 204a-204s is attached to the heating pad 206a-206s on the user proximal side of the heating pad, i.e. the side of the heating pad that is closest to the user. The temperature sensor 204a-204s are positioned on the centre of the heating pad 206a-206s. Each temperature sensor 204a-204s can measure the skin temperature through a layer of textile of the wearable garment 202. Alternatively, the temperature sensor 204a-204s may be positioned in direct skin contact and can measure skin temperature via contact sensing.

As shown in FIG. 2 each temperature sensor 204a-204s and each heating pad 206a-206s is arranged such that, in use, each temperature sensor 204a-204s and each heating pad 206a-206s are arranged to align with or adjacent to the most temperature sensitive locations on the user's body. Each temperature sensor and each heating pad, in use, is positioned at least adjacent to or at the user's abdomen, the user's chest, the user's back, the user's upper leg, the user's lower leg, the user's upper arm, the user's lower arm and optionally at the shoulder blades. The heating pad may also align with a central back, in particular a heating pad is positioned along the spine of a user.

As illustrated in FIG. 2 and FIG. 3 each temperature sensor 204a-204s and each heating pad 206a-206s is positioned on the wearable garment 202 such that, in use, the temperature sensor is aligned with or arranged adjacent to a major muscle group of the user's body. As shown in FIG. 2, each heating pad 206a-206s is also positioned on the wearable garment 202 such that, in use, the heating pad 206a-206s aligns with or is positioned adjacent to a major muscle group of the user.

FIGS. 2 and 3 show an in-use arrangement of the temperature sensors and the heating pads. FIG. 2 shows a front view of the wearable garment 202 with temperature sensors 204a-204k and heating pads 204a-204k positioned on it. Referring to FIG. 2, temperature sensor 204a is positioned at the upper right chest area. Temperature sensor 204a is positioned on the right pectoralis major. Temperature 204b is positioned on the upper left chest area. Temperature sensor 204b is positioned on the left pectoralis major. Temperature sensors 204c and 204d are positioned along the right arm of the user, sensor 204c being positioned within the upper arm region and sensor 204d being positioned on the lower arm region. As shown in FIG. 2 temperature sensor 204c is positioned on the right bicep of the user and temperature sensor 204d is positioned on the right forearm of the user. Temperature sensor 204e is located, in use, on the upper left arm region and temperature sensor 204f is located on the lower left arm. As shown in FIG. 2 temperature sensor 204e is positioned on the left bicep of the user and temperature sensor 204f is positioned on the left forearm of the user. Still referring to FIG. 2 temperature sensors 204g and 204h are, respectively, positioned on right and left lateral abdominal muscles of the user. Temperature sensors 204i, 204j and 204k are positioned along the centre abdomen of the user. Sensor 204i is positioned highest on the abdomen adjacent to the sternum, sensor 204j is positioned in the middle abdomen and sensor 204k is positioned on the lower abdomen adjacent to the navel. Preferably sensor 204k is positioned at least 5 cm below the navel of the user. The temperature sensors 204i-204k are positioned along the rectus abdominis muscle group of the user.

FIG. 3 shows a rear of the wearable garment with positions of temperature sensors 204l-204s and heating pads 206l-206s. As shown in FIG. 3 temperature sensor 204l is positioned on the upper back, substantially in the center of the upper back. The sensor 204l is positioned on the trapezius muscle of the user. Temperature sensors 204m and 204n are located, in use, at the upper arm and lower left arm respectively. Temperature sensor 204m is positioned on the left tricep of the user. Temperature sensor 204n is positioned on the left posterior region of the user's forearm. Temperature sensors 204o and 204p are positioned on the upper and lower right arm respectively. Temperature sensor 204o is positioned on the right tricep of the user and temperature sensor 204p is positioned on the right posterior forearm of the user. Temperature sensors 204q and 204r are positioned on the mid back of the user, substantially on the latissimus dorsi muscle. Temperature sensor 204s is positioned on the lower back or lumbar region of the user.

The system 200 may optionally include an additional sensor that is, in use, positioned on the wrist of the user. Each wrist can include a single sensor. The wrist sensor measures the temperature at the wrist. The wrist sensor is positioned at a region of the wrist that includes several blood vessels to allow the system to rapidly gather a body temperature.

FIGS. 2 and 3 show the arrangement of the heating pads 206a-206s. Each of the temperature sensors 204a-204s is associated with and attached to one of the heating pads 206a-206s. Referring again to FIG. 2 heating pad 206a is located on the right upper chest of the user, and heating pad 206a is shaped to sit on and substantially cover the right pectoralis major muscle. Heating pad 206b is positioned on the left upper chest of the user. Heating pad 206b is shaped to sit on and substantially cover the left pectoralis major muscle of the user. Heating pads 206c and 206d are located along the right arm of the user. Heating pad 206c is shaped and arranged to substantially cover the right bicep muscle of the user. Heating pad 206d is shaped and arranged around the anterior region of the right forearm. Heating pads 206e and 206f are arranged along the left arm of the user. Heating pad 206e is shaped and arranged to cover substantially the left bicep muscle of the user. Heating pad 206f is shaped and arranged around the anterior region of the left forearm of the user. Heating pads 206g and 206h are substantially elongate in shape and extend along right and left lateral abdominal regions of the user respectively. Each of the heating pads 206g and 206h extend from the lower abdomen to the beginning of the chest and respectively substantially cover a right side and left side of the user's body. Heating pads 206i, 206j and 206k are positioned along the mid-abdominal region. Heating pads 206i, 206j and 206k align with the rectus abdominis muscle of the user. The heating pads 206i, 206j and 206k are identical in size to each other. As seen in FIG. 2 some heating pads are rectangular in shape and some heating pads are square in shape. The heating pads 206a-206k can be any suitable or desired shape.

Referring back to FIG. 3, there is shown a rear view with the locations and arrangement of the heating pads 206l-206s. Heating pad 204l is positioned on the upper back of the user when the garment 202 is worn. Heating pad 204l is rectangular in shape and extends along the trapezius muscle. Heating pads 206m and 206n are positioned along the left arm of the user. Heating pad 206m is positioned along and substantially covers the left tricep muscle. Heating pad 206n is positioned around the posterior forearm region. Heating pads 206m and 206n are rectangular in shape. Heating pads 206o and 206p are positioned along the right arm. Heating pad 206o is located on and substantially covers the right tricep. Heating pad 206p is located along the posterior forearm region of the right arm. Heating pads 206o and 206p are rectangular in shape. Heating pads 206q and 206r are rectangular in shape and arranged in the mid back region of the user's back. Heating pad 206q is positioned along and substantially extends along the length of the right latissimus dorsi muscle. Heating pad 206r is arranged along and substantially extends along the length of the left latissimus dorsi muscle. Heating pad 206s is an elongate rectangular pad that extends along the lower back or lumbar region of the user.

The heating pads 206a-206s are positioned along and at least partially cover a user's major muscle groups as the major muscle groups of a user's body provide an easy location feature. The major muscle groups provide an easy alignment or location feature on the user's body for positioning the heating pads and temperature sensors.

The temperature regulation system 200 comprises a controller unit 208 that is disposed on the wearable garment 202. The controller 208 is removably attached to the wearable shirt 202. The shirt 202 may include a further pocket into which the controller 208 can be inserted.

The controller 208 is in wire or wireless communication with each of the temperature sensors 204a-204s and each of the heating pads 206a-206s. The temperature sensors 204a-204s are connected to the controller 208 via data wires. The controller 208 receives temperature measurements from the temperature sensors 204a-204s. The data wires are attached to the wearable garment. The data wires can be adhered to or sown into the garment 202. The heating pads 206a-206s are connected to the controller 208 via power lines. The power lines provide a power signal or an activation signal to one or more of the heating pads 206a-206s, from the controller 208. The controller 208 can make and break connections with the data wires and the power lines in a single action as the controller is removed and attached to the wearable article 202.

The controller 208 includes at least a processor, a memory unit and a power unit. The power unit generates power and the power unit comprises rechargeable batteries. The processor, memory unit and power unit are arranged in a casing. The controller 208 and casing are disposed on the wearable garment.

The controller 208 is configured to receive temperature measurements from each of the temperature sensors 204a-204s. The controller 208 samples the temperature sensors 204a-204s periodically or at least continuously to receive a temperature measurement. The sampling frequency can be any suitable frequency. For this example, the sensors sampling frequency is once every 2 seconds, i.e. 0.5 Hz. The sampling frequency can be much higher and improved sensors can have sampling frequencies in the megahertz range. The controller 208 compares each temperature measurement with a threshold temperature. The controller 208 activates one or more heating pads 206a-206s if the temperature measurement is less than the threshold temperature.

The temperature regulation system 200 further includes an environmental sensor 210. The environmental sensor 210 is arranged on wearable article 202. The environmental sensor 210 is not in contact with the skin of the user. As shown in FIG. 2, the wearable article 202 includes a textile or fabric loop 212. The environmental sensor 210 is positioned on the textile fabric loop 212 such that the environmental sensor 210 does not contact the skin of the user. Alternatively, the environmental sensor 210 can be positioned anywhere on the garment 202 such that it is not in contact with the user's skin. In other forms the garment 202 may include multiple environmental sensors disposed on the garment.

The environmental sensor 210 determines an environmental parameter. The environmental parameter is a parameter related to the ambient environment of the user. For example, the environmental parameter can be any one or more of relative humidity, ambient temperature, or wind speed. In some embodiments, a wind chill parameter can also be calculated and used as an environmental parameter. In the embodiment illustrated in FIG. 2 the temperature regulatory system 200 includes one environmental sensor 210. The environmental sensor 210 is a humidity sensor that is configured to measure relative humidity. Alternatively, relative humidity can be determined. In a further alternative, the environmental sensor 210 may be configured to measure an ambient temperature.

The measured environmental parameter is provided to the controller 208. The controller 208 processes the environmental parameter to adjust a threshold temperature. The environmental sensor continuously measures the environmental parameter and continuously transmits the environmental parameter to the controller 208. The controller 208 periodically samples the environmental sensor 210 to obtain the environmental parameter. The sampling rate can be any suitable sampling rate. Alternatively, the controller 208 may continuously sample the environmental sensor.

As shown in FIG. 2, the system 200 further includes a motion sensor 214 that is positioned on the wearable garment 202. The motion sensor 214 is configured to determine a motion measurement. The motion measurement is related to a motion of the user. The motion sensor 214 being connected to the garment 202 allows for a more accurate motion measurement. Alternatively, the system may include a plurality of motion sensors 214 positioned at various locations for example adjacent to each temperature sensor to determine the motion of each portion of the user's body.

In the illustrated embodiment of FIGS. 2 and 3, the motion sensor 214 is a 3-axis accelerometer. The accelerometer 214 detects or measures the body movements of the user. The motion measurement is an acceleration measurement or a velocity measurement. The motion measurement is sampled by the controller 208 from the motion sensor 214. The motion sensor 214 is sampled at any suitable sampling rate. The controller 208 uses the motion measurement to adjust the threshold temperature based on a predetermined relationship.

The temperature regulation system 200 further comprises a user device 216. The user device 216 is a low energy wireless device. In the illustrated embodiment, the user device 216 is a smartphone or a tablet. The user device 216 is a portable device that includes at least a processor, a memory and a user interface. The user can input information to and communicate with the controller 208 via the user device 216. The controller 208 can also transmit information to the user device 216 for display to the user. The user device 216 uses a low energy wireless system such as Bluetooth or infra-red as the wireless communication protocol.

The controller 208 receives a user parameter from the user via the user device 216. The user parameter is input by the user into the user device 216. The user parameter is a specific characteristic of a user. Some examples of user parameters are age, gender, thermal sensitivity, weight and so on. The controller 208 processes a received one or more user parameter and further modifies the threshold temperature based on the received user parameters. The functionality of the controller will be described in more detail later within this specification.

FIGS. 4 and 5 show another embodiment of a temperature regulation system 400 for regulating the body temperature or skin temperature of the user. As seen in FIGS. 4 and 5 the system 400 comprises a wearable garment 402. The wearable garment 402 is a long sleeve women's shirt. The shirt 402 is made from any suitable artificial or natural textile material. Preferably the shirt 402 is made from a fabric or textile blend such as a polyester, polyamide blend, or elastane or any other suitable material. Alternatively, the shirt 402 may be formed from wool or cotton etc. The women's shirt 402 is made of a material that allows breathability, softness, and is stretchable.

The temperature regulation system 400 comprises a plurality of temperature sensors 404a-404p and a plurality of heating pads 406a-406p. The temperature sensors 404a-404p and the heating pads 406a-406p are integrated into the shirt 402 or attached to the shirt 402. The sensors 404a-404p and the heating pads 406a-406p may be sewn or adhered to the shirt 402. Alternatively, the shirt 402 may include pockets that receive and retain the heating pads 406a-406p and the temperature sensors 404a-404p.

The temperature sensors 404a-404p positioned such that there is a layer or textile between the sensor and the skin, such that the sensors do not make direct contact with the skin. Alternatively, the temperature sensors 404a-404p may be arranged such that they make direct contact with the user's skin. The temperature sensors 404a-404p are attached to the heating pads 406a-406p. Each temperature sensor, of the plurality of temperature sensors 404a-404p, is attached to a single heating pad of the plurality of heating pads 406a-406p. Each temperature sensor 404a-404p is associated with a single heating pad 406a-406p. The temperature sensor 404a-404p being attached to the heating pads 406a-406p allows the controller to determine a temperature of a portion of the user's body and then apply heat to the same portion if a temperature is below a threshold temperature. This is made possible by the one to one relationship of the temperature sensor and heating pad.

FIGS. 4 and 5 show an arrangement of the temperature sensors 404a-404p around the shirt 402. FIGS. 4 and 5 show an exemplary arrangement of the temperature sensors 404a-404p. As seen in FIG. 4, the system 400 comprises a temperature sensor 404a that is positioned in the upper chest region. Temperature sensors 404b and 404c are located on the right arm of the user, in use. Temperature sensor 404b is positioned on the right arm bicep. Temperature sensor 404c is positioned on the right forearm of the right arm, specifically on the anterior region of the right forearm. Temperature sensors 404d and 404e are positioned on the left arm of the user. As shown in FIG. 4 temperature 404d is located on the left bicep of the user. Temperature sensor 404e are located on the left anterior forearm of the user, in use. Sensors 404f and 404g are located on lateral abdominal regions of the user. Sensor 404f is positioned on the right lateral abdominal region, and sensor 404g is located on the left lateral abdominal region. Temperature sensor 404h is located on the mid abdominal region of the user. Sensor 404h is located on the rectus abdominis muscle of the user. Temperature sensor 404i is positioned on the lower abdominal region, adjacent to the navel of the user.

FIG. 5 shows a rear view of the shirt 402. As shown in FIG. 5, temperature sensor 404j is located on the upper back portion of the user, in use. The temperature sensor 404j is located on the trapezius muscle of the user when the shirt 402 is worn. Temperature sensors 404k and 404l are located on the rear of the left arm of the user, when the shirt 402 is worn by the user. Sensor 404k is positioned on the left tricep of the user, and sensor 404l is located on the posterior region of the left forearm of the user. Temperature sensors 404m and 404n are located on the rear of the right arm of the user. Temperature sensor 404m is positioned on the right tricep of the user. Temperature sensor 404n is located on the posterior region of the right forearm of the user. Temperature sensor 404o is located on the mid back portion, the sensor 404o being substantially positioned on the latissmus dorsi muscle. Temperature sensor 404p is located on the lower back of the user, sensor 404p being located on the lower lumbar region of the user.

FIGS. 4 and 5 show an arrangement of heating pads 406a-406p on the shirt and in use. As shown in FIG. 4 heating pad 406a is located on the upper chest of the user. Heating pad 406a is positioned to cover a part of the left and right pectoralis major muscles. Heating pads 406b and 406c are positioned on the right arm of the user, in use. Heating pads 406b and 406c are rectangular in shape. Heating pad 406b is positioned on the right bicep of the user and heating pad 406c is positioned on the anterior region of the right forearm of the user. Heating pads 406d and 406e are positioned on the left arm of the user, in use. Heating pads 406d and 406e are also substantially rectangular in shape. Heating pad 406d is located on the left bicep of the user and heating pad 406e is located on the anterior region of the left forearm of the user. Heating pads 406f and 406g are located on right and left lateral abdominal regions of the user. Heating pad 406f is located on the right lateral abdominal muscle. Heating pad 406g is located on the left lateral abdominal muscle. Heating pads 406f and 406g are rectangular in shape and substantially cover the lateral abdominal regions. Heating pad 406h is rectangular in shape and is positioned on the mid abdominal region. As shown in FIG. 4 heating pad 406h, in use, is positioned along the rectus abdominis muscle. Heating pad 406i is substantially rectangular in shape and extends along the lower abdominal portion.

FIG. 5 shows a rear view of the shirt 402 and an arrangement of heating pads 406j-406p on the rear of the shirt 402. As shown in FIG. 5, heating pad 406j is located on the upper back portion of the user. Heating pad 406j is rectangular in shape and extends at least partially across the trapezius muscle of the user. Heating pads 406k and 406l are located on the rear portion of the left arm of the user. Heating pad 406k extends substantially along the left tricep of the user. Heating pad 406l extends substantially along the posterior region of the left forearm of the user. Heating pads 406l and 406k are substantially rectangular in shape. Heating pads 406m and 406n are positioned on the rear portion of the right arm of the user. Heating pads 406m and 406n are substantially rectangular in shape. Heating pad 406m is located along and substantially covers the right tricep muscle of the user. Heating pad 406n is located along the posterior portion of the right forearm. Heating pad 406o is positioned on the mid back portion of the user, in use. Heating pad 406o is substantially rectangular in shape and extends substantially along the mid back and latissimus dorsi muscle of the user. Heating pad 406o extends along the spine from the thoracic to lumbar region of the back. Heating pad 406p is positioned on and extends along the lumbar region of the user. Heating pad 406p are substantially rectangular in shape and heating pad 406p wraps around the lower back region.

The temperature regulation system 400 comprises a controller 408. The controller unit 408 is disposed on the wearable garment 202. The controller 408 is removably attached to the wearable shirt 402. The shirt 402 may include a further pocket into which the controller 408 can be inserted.

The controller 408 is in wire or wireless communication with each of the temperature sensors 404a-404p and each of the heating pads 406a-406p. The temperature sensors 404a-404p are connected to the controller 408 via data wires. The controller 408 receives temperature measurements from the temperature sensors 404a-404p. The data wires are attached to the wearable garment. The data wires can be adhered to or sown into the garment 402. The heating pads 406a-406p are connected to the controller 408 via power lines. The power lines provide a power signal or an activation signal to one or more of the heating pads 406a-406p, from the controller 408. The controller 408 can make and break connections with the data wires and the power lines in a single action as the controller is removed and attached to the wearable article 402.

The controller 408 includes at least a logical unit, such as a processor, a memory unit, and a controlling unit. It may further include a power unit. The logical unit, memory unit, controlling unit, and power unit are arranged in a casing. The controller 408 is similar in structure and function as controller 208.

The controller 408 is configured to receive temperature measurements from each of the temperature sensors 404a-404p. The controller 408 compares each temperature measurement with a threshold temperature. The controller 408 activates one or more heating pads 406a-406p if the temperature measurement is less than the threshold temperature.

The temperature regulation system 400 further includes an environmental sensor 410. The environmental sensor 410 is arranged on wearable article 402. The environmental sensor 410 is not in contact with the skin of the user. As shown in FIG. 4, the wearable article 402 includes a textile or fabric loop 412. The environmental sensor 410 is positioned on the textile fabric loop 412 such that the environmental sensor 410 does not contact the skin of the user. Alternatively, the environmental sensor 410 can be positioned anywhere at any other location on the wearable article 402, such that it is not in contact with the user's skin. In other forms the garment 402 may include multiple environmental sensors disposed on the garment.

The environmental sensor 410 determines an environmental parameter. The environmental parameter is a parameter related to the ambient environment of the user. For example, the environmental parameter can be any one or more of relative humidity, ambient temperature, or wind speed. The environmental sensor 410 is a humidity sensor that is configured to measure relative humidity. Alternatively, relative humidity can be determined. In a further alternative, the environmental sensor 410 may be configured to measure an ambient temperature.

The measured environmental parameter is provided to the controller 408. The controller 408 processes the environmental parameter to adjust a threshold temperature. The environmental sensor continuously measures the environmental parameter and continuously transmits the environmental parameter to the controller 408. The controller 408 periodically or continuously samples the environmental sensor 410 to obtain the environmental parameter. The sampling rate can be any suitable sampling rate for example 0.5 Hz or in the megahertz range.

As shown in FIG. 4, the system 400 further includes a motion sensor 414 that is positioned on the shirt 402. The motion sensor 414 is configured to determine a motion measurement. The motion measurement is related to a motion of the user. The motion sensor 414 being connected to the garment 402 allows for a more accurate motion measurement. Alternatively, the system may include a plurality of motion sensors 414 positioned at various locations for example adjacent each temperature sensor to determine the motion of each portion of the user's body.

In the illustrated embodiment of FIG. 4, the motion sensor 414 is a 3-axis accelerometer. The accelerometer 414 detects or measures the body movements of the user. The motion measurement is an acceleration measurement or a velocity measurement. The motion measurement is sampled by the controller 408 from the motion sensor 414. The motion sensor 414 is sampled at any suitable sampling rate. The controller 408 uses the motion measurement to adjust the threshold temperature based on a predetermined relationship.

The temperature regulation system 400 further comprises a user device 416. The user device 416 is a low energy wireless device. In the illustrated embodiment, the user device 416 is a smartphone or a tablet. The user device 416 is a portable device that includes at least a processor, a memory and a user interface. The user can input information to and communicate with the controller 408 via the user device 416. The controller 408 can also transmit information to the user device 416 for display to the user. The user device 416 uses a low energy wireless system such as Bluetooth or infra-red as the wireless communication protocol.

The controller 408 receives a user parameter from the user via the user device 416. The user parameter is input by the user into the user device 416. The user parameter is a specific characteristic of a user. Some examples of user parameters are age, gender, thermal sensitivity, weight and so on. The controller 408 processes a received one or more user parameter and further modifies the threshold temperature based on the received user parameters. The functionality of the controller will be described in more detail later within this specification.

FIGS. 6 and 7 show a further embodiment of the temperature regulation system 600. FIGS. 6 and 7 show the temperature regulation system 600 that comprises a plurality of temperature sensors 604a-604h and a plurality of heating pads 606a-606h as used with pants or tights. The system 600 is similar in function to the temperature regulation systems as described with respect to FIGS. 2 to 5. The embodiment of FIGS. 6 and 7 is another arrangement of the sensors and heating pads on a different type of garment.

As shown in FIGS. 6 and 7 the wearable garment 602 is a pair of pants. The pants are suitable for male or female use. The illustrated pants are tights and are form fitting, in order to ensure correct positioning of the sensors 604a-604h and heating pads 606a-606h when the pants are worn by a user. The pants 602 can be made from spandex or elastane or polyester or a blend of multiple textiles. Alternatively, the pants may be made of natural fibres such as cotton or wool.

The temperature sensors 604a-604h and heating pads 606a-606h may be adhered to the pants or may be positioned within pockets positioned at various locations on the pants 602. As in previous embodiments each temperature sensor 604a-604h is associated with a single heating pad 606a-606h, and each temperature sensor 604a-604h is connected to a single heating pad 606a-606h.

The temperature sensors 604a-604h are adapted to sense temperature through a layer of textile but may be arranged to be in direct skin contact. The heating pads 606a-606h are positioned on the pants 602 such that there is layer of textile between the pads and the user's skin to avoid any damage from excessive heat delivery. The temperature sensors 604a-604h are similar in size and make to sensors 204a-204s. The heating pads 606a-606h are similar in make and structure to heating pads 206a-206s.

FIGS. 6 and 7 show an, in use, arrangement of the temperature sensors 604a-604h and the heating pads 606a-606h on the pants 602. Referring to FIG. 6, there is shown a front view of the pants 602. The pants 602 comprise temperature sensors 604a-604d positioned on the front side of the user's legs, in use. Temperature sensor 604a is positioned on the right upper thigh region of the user. Temperature sensor 604a is substantially aligned with or positioned adjacent to the right quadriceps muscle of the user. Temperature sensor 604b is positioned on the left upper thigh of the user, wherein sensor 604b is aligned with or positioned adjacent to the left quadriceps muscle of the user. Temperature sensor 604c is located on the lower right leg of the user. As illustrated in FIG. 6 temperature sensor 604c is located on the right shin of the user. Temperature sensor 604d is located on the lower left leg of the user, specifically on the left shin of the user.

FIG. 7 shows a rear view of the pants 602. As shown in FIG. 7 temperature sensor 604e is located on the upper portion of the rear part of the left leg. Temperature sensor 604e is located on the left hamstring area of the user. Temperature sensor 604f is located on the upper portion of the rear part of the right leg of the user, more specifically on the right hamstring area of the user. Temperature sensors 604g and 604h are located on the lower rear left leg and lower rear right leg, respectively. Temperature sensor 604g is located on the left calf muscle of the user and the sensor 604h is located on the right calf muscle of the user.

Referring back to FIG. 6 there is shown a distribution of heating pads 606a-606d on the pants 602. Heating pad 606a is located on the right upper thigh region of the user. Heating pad 606a is rectangular in shape and extends substantially along the right quadriceps muscle in use. Heating pad 606b is located on the left upper thigh region of the user, specifically rectangular shaped heating pad 606b is extends substantially along the left quadriceps muscle of the user in use. Heating pads 606c and 606d are located on the lower left leg and lower right leg respectively. Heating pads 606c and 606d are substantially rectangular in shape and extend along the left shin and right shin respectively.

Referring to FIG. 7, heating pad 606e is located on the rear part of the upper left leg of the user. The rectangular shaped heating pad 606e extends along the left hamstring of the user. Heating pad 606f is located on the rear part of the upper right leg of the user. The rectangular shaped heating pad 606f is located and extends along the right hamstring of the user. Heating pads 606g and 606h are substantially rectangular in shape. Heating pad 606g extends along the left calf muscle of the user and heating pad 606h extends along the right calf muscle of the user.

The temperature regulation system 600 further comprises a controller 608 that is located on the pants 602. As shown in FIG. 6 the controller 608 is located on the upper portion of the pants. The temperature sensors 604a-604h are connected to the controller via data lines or wires to transmit temperature measurements from the temperature sensors 604a-604h to the controller. The data lines in system 600 are similar or identical to the data lines described with respect to the embodiment described in FIGS. 2 and 3. The data lines may be adhered to the pants or sewn into the material of the pants 602 or may be deposited by any suitable deposition method. The heating pads 606a-606h are connected to the controller 608 by power lines, similar to those described earlier. The controller 608 can vary the power delivered to the heating pads 606a-606h.

The controller 608 is similar in structure and function to the controllers 208 and 408. The controller 608 includes at least a processor, memory unit and a power unit. The power unit includes rechargeable batteries to provide power. The controller 608 receives a temperature measurement from each temperature sensor 604a-604h, compares the temperature measurement with a threshold temperature and selectively activates a heating pad 606a-606h that is associated with the sensor that provided a temperature measurement that was less than the threshold temperature. The controller 608 activates one or more heating pads 606a-606h if the temperature measurement is less than the threshold temperature. The controller 608 is removably connected to the garment 602. The controller 608 is shape and structured such that connections with the data lines and power lines can be made or broken with ease for example via a single action or motion.

The temperature regulation system 600 further includes an environmental sensor 610. The environmental sensor 610 is arranged on the pants 602. The environmental sensor 610 is not in contact with the skin of the user. As shown in FIG. 6, the pants 202 includes a textile or fabric loop 612 located at the top of the pants. The loop 612 may be located at any suitable location on the pants 602. The environmental sensor 610 is positioned on the textile fabric loop 612 such that the environmental sensor 610 does not contact the skin of the user. Alternatively, the environmental sensor 610 can be positioned anywhere on the garment 602 such that it is not in contact with the user's skin. In other forms the garment 602 may include multiple environmental sensors disposed on the garment.

The environmental sensor 610 determines an environmental parameter. The environmental parameter is a parameter related to the ambient environment of the user. For example, the environmental parameter can be any one or more of relative humidity, ambient temperature, or wind speed. In the embodiment illustrated in FIG. 6 the temperature regulatory system 600 includes one environmental sensor 610. The environmental sensor 610 is a humidity sensor that is configured to measure relative humidity. Alternatively, relative humidity can be determined. In a further alternative, the environmental sensor 610 may be configured to measure an ambient temperature.

The measured environmental parameter is provided to the controller 608. The controller 608 processes the environmental parameter to adjust a threshold temperature. The environmental sensor continuously measures the environmental parameter and continuously transmits the environmental parameter to the controller 608. The controller 608 periodically or continuously samples the environmental sensor 610 to obtain the environmental parameter. The sampling rate can be any suitable sampling rate.

As shown in FIG. 6, the system 600 further includes a motion sensor 614 that is positioned on the wearable garment 602. The motion sensor 614 is configured to determine a motion measurement. The motion measurement is related to a motion of the user. The motion sensor 614 is attached to the pants 602 adjacent to the controller 608. The motion sensor 614 allows for a more accurate motion measurement. Alternatively the system 600 may include a plurality of motion sensors 614 positioned at various locations, for example, adjacent to each temperature sensor to determine the motion of each portion of the user's body.

In the illustrated embodiment of FIG. 6, the motion sensor 614 is a 3-axis accelerometer. Alternatively, the motion sensor may be a gyroscope. The accelerometer 614 detects or measures the body movements of the user. The motion measurement is an acceleration measurement or a velocity measurement. The motion measurement is sampled by the controller 608 from the motion sensor 614. The controller 608 is in wire or wireless communication with the motion sensor 614. The motion sensor 614 is sampled at any suitable sampling rate. The controller 608 uses the motion measurement to adjust the threshold temperature based on a predetermined relationship.

The temperature regulation system 600 further comprises a user device 616. The user device 616 is a low energy wireless device. In the illustrated embodiment, the user device 616 is a smartphone or a tablet. The user device 616 is a portable device that includes at least a processor, a memory and a user interface. The user can input information to and communicate with the controller 608 via the user device 616. The controller 608 can also transmit information to the user device 616 for display to the user. The user device 616 uses a low energy wireless system such as Bluetooth or infra-red as the wireless communication protocol.

The controller 608 receives a user parameter from the user via the user device 616. The user parameter is input by the user into the user device 616. The user parameter is a specific characteristic of a user. Some examples of user parameters are age, gender, thermal sensitivity, weight and so on. The controller 608 processes a received one or more user parameter and further modifies the threshold temperature based on the received user parameters. The functionality of the controller will be described in more detail later within this specification.

FIG. 8 shows a further embodiment of a temperature regulation system for regulating the temperature of a portion of a user's body. FIG. 8 shows a temperature regulation system 800 that comprises at least one temperature sensor 804a and a heating pad 806a being disposed on a wearable garment 802 is a glove that is wearable by a user.

The glove 802 is made from any suitable material such as wool, cotton, leather, polyester, spandex or a blend of two or more materials. FIG. 8 shows a dorsal view and a bottom view of the glove. As shown in FIG. 8 the glove 802 comprises three temperature sensors 804a-804c and a heating pad 806a.

The three temperature sensors 804a-804c can be permanently integrated or attached to the glove 802. The heating pad 806a can also be integrated into the glove or attached to the glove 802. The glove 802 may include one or more pockets that receive and retain the temperature sensors 804a-804c and the heating pad 806a.

As shown in FIG. 8 temperature sensor 804b is positioned at the end of the ring finger portion of the glove such that the sensor aligns with the ring finger of the user, in use. Sensor 804c is positioned at the end of the little finger portion of the glove such that the sensor 804b aligns with the little finger of the user. The temperature sensors 804b and 804c are positioned on the dorsal side of the glove. Temperature sensor 804a is positioned on the palm section of the glove 802. The temperature sensor 804 aligns with the palm of the user in use. In alternative forms the glove 802 may comprise additional temperatures sensors, for example each fingertip portion of each finger may include a temperature sensor disposed upon it.

Heating pad 806a is positioned on the palm section of the glove 802. The heating pad 806a provides heat to the palm of the user. The heating pad 806a is arranged on the glove 802 such that there is a layer of textile between the heating pad 806a and the hand of the user. The system 800 may include a plurality of heating pads, for example a heating pad positioned on each finger section of the glove 802.

The temperature regulation system 800 further includes a controller 808 that is arranged on the glove. As shown in FIG. 8 the controller 808 is arranged at the base of the glove 802. The controller 808 is similar to the controller 208 or 408 as described earlier. The controller 808 includes a processor, a memory unit and a power supply unit. The power unit includes rechargeable batteries for providing power. The controller 808 can be removably attached to the glove 802.

The controller 808 is in wire or wireless communication with each of the temperature sensors 804a-204c and the heating pad 806a. The temperature sensors 804a-804c are connected to the controller 808 via data wires. The controller 808 receives temperature measurements from the temperature sensors 804a-804c. The data wires are attached to the wearable garment. The data wires can be adhered to or sown into the glove 802. The heating pad 806a is connected to the controller 808 via power lines. The power lines provide a power signal or an activation signal to the heating pad 806a from the controller 808. The controller 808 can make and break connections with the data wires and the power lines in a single action as the controller is removed and attached to the wearable article, i.e. glove 802.

The controller 808 is configured to receive temperature measurements from each of the temperature sensors 804a-804c. The controller 808 samples the temperature sensors 804a-804c continuously to receive a temperature measurement. Alternatively, the temperature sensors are sampled periodically by the controller. The sampling frequency can be any suitable frequency. For example, the controller samples the temperature sensors 804a-804c every millisecond. The controller 808 compares each temperature measurement with a threshold temperature. The controller 808 activates the heating pad 806a if the temperature measurement is less than the threshold temperature.

The temperature regulation system 800 further includes an environmental sensor 810. The environmental sensor 810 is arranged on wearable article 802. The environmental sensor 810 is not in contact with the skin of the user. As shown in FIG. 8, the wearable article 802 includes a textile or fabric loop 812. The environmental sensor 810 is positioned on the textile fabric loop 812 such that the environmental sensor 810 does not contact the skin of the user. Alternatively, the environmental sensor 810 can be positioned anywhere on the garment 802 such that it is not in contact with the user's skin. In other forms the garment 802 may include multiple environmental sensors disposed on the garment.

The environmental sensor 810 determines an environmental parameter. The environmental parameter is parameter related to the ambient environment of the user. For example, the environmental parameter can be any one or more of relative humidity, ambient temperature, or wind speed. In the embodiment illustrated in FIG. 8 the temperature regulatory system 800 includes one environmental sensor 810. The environmental sensor 810 is a humidity sensor that is configured to measure relative humidity. Alternatively, relative humidity can be determined. In a further alternative, the environmental sensor 810 may be configured to measure an ambient temperature.

The measured environmental parameter is provided to the controller 808. The controller 808 processes the environmental parameter to adjust a threshold temperature. The environmental sensor continuously measures the environmental parameter and continuously transmits the environmental parameter to the controller 808. The controller 808 periodically or continuously samples the environmental sensor 810 to obtain the environmental parameter. The sampling rate can be any suitable sampling rate.

As shown in FIG. 8, the system 800 further includes a motion sensor 814 that is positioned on the wearable garment 802. The motion sensor 814 is configured to determine a motion measurement. The motion measurement is related to a motion of the user. The motion sensor 814 being connected to the garment 802 allows for a more accurate motion measurement. Alternatively, the system may include a plurality of motion sensors 814 positioned at various locations for example adjacent to each temperature sensor to determine the motion of each portion of the user's body.

The motion sensor 814 is a 3-axis accelerometer, but could alternatively be a gyroscope. The accelerometer 814 detects or measures the body movements of the user. The motion measurement is an acceleration measurement or a velocity measurement. The motion measurement is sampled by the controller 808 from the motion sensor 814. The motion sensor 814 is sampled at any suitable sampling rate. The controller 808 uses the motion measurement to adjust the threshold temperature based on a predetermined relationship.

The temperature regulation system 800 further comprises a user device 816. The user device 816 is a low energy wireless device. In the embodiment shown in FIG. 8, the user device 816 is a smartphone or a tablet. The user device 816 is a portable device that includes at least a processor, a memory and a user interface. The user can input information to and communicate with the controller 808 via the user device 816. The controller 808 can also transmit information to the user device 816 for display to the user. The user device 816 uses a low energy wireless system such as Bluetooth or infra-red as the wireless communication protocol.

The controller 808 receives a user parameter from the user via the user device 816. The user parameter is input by the user into the user device 816. The user parameter is a specific characteristic of a user. Some examples of user parameters are age, gender, thermal sensitivity, weight and so on. The controller 808 processes a received one or more user parameter and further modifies the threshold temperature based on the received user parameters.

FIG. 9 shows a further embodiment of the temperature regulation system. The temperature regulation system 900 is disposed on a wearable garment 902. The wearable garment 902 is a sock. The sock may include a plurality of temperature sensors disposed on it. The sock 902 can also comprise heating pads disposed on the sock. The temperature sensors and heating pads disposed on the sock 902. As shown in FIG. 9, the sock 902 includes two temperature sensors 904a-904b. Temperature sensor 904a is located at the toe such that the sensor aligns with the middle toe of the user, in use. Temperature sensor 904b is located on the heel portion of the sock. Additional temperature sensors can be added to the sock 902.

The sock 902 also includes a heating pad 906a-906b. Heating pad 906a is positioned on the toe region of the sock 902. Heating pad 906b is positioned at the heel region of the sock, to align with the heel of the user, in use. The temperature sensors and heating pads of embodiment 900 are similar in shape and structure to temperature sensors 204a-204s and heating pads 206a-206s.

The sock 902 also includes a controller 908 disposed upon it. The controller 908 is preferably positioned at the top of the sock adjacent to the opening that receives a user's foot. The controller 908 can be removably coupled or attached to the sock 902. The controller 908 receives temperature measurements from the temperature sensors 904a-904b and compares the temperature measurement with a threshold temperature. The controller 908 activates a specific heating pad 906a-906b where the temperature is below the threshold temperature. The controller 908 is similar in shape and structure as the controller described earlier i.e. similar to controller 208, 408, 608 or 808.

The sock 902 also includes an environmental sensor 910 to measure an environmental parameter. The environmental sensor 910 is not in contact with the user's skin. The environmental parameter can be any parameter associated with the ambient environment such as relative humidity, relative humidity, ambient temperature etc. The environmental sensor 910 measures at least the relative humidity and provides the humidity measurement to the controller 908. The controller modifies the threshold temperature and controls activation of the heating pads 906a-906b based on the environmental parameter.

The sock 902 further comprises a motion sensor 914 that provides a movement measurement of the user. The motion sensor 914 determines the movement of the user. The motion sensor 914 is a 3-axis accelerometer. Alternatively, the motion sensor may be a gyroscope. The controller 908 receives a movement measurement from the motion sensor 914. The controller 908 adjusts the threshold temperature based on the movement measurement.

The temperature regulation system 900 further comprises a user device 916 that is in wireless communication with the controller 908. The user device can communicate using a low energy wireless system or protocol like for example infrared or Bluetooth. The user device 916 is a portable low energy wireless device such as a smartphone or tablet. A user can input one or more user parameters that are received by the controller 908. The user parameters are unique to each user and can be any suitable user parameter such as age, gender, weight, thermal sensitivity etc. The controller 908 is configured to change the threshold temperature based on the user parameters.

The structure and operation of the controller for the temperature regulation system will now be described with respect to FIGS. 10 to 12. FIG. 10 shows a controller 1000. The controllers 106, 208, 408, 608, 808 and 908 are similar to each other. Controllers 106, 208, 408, 608, 808, 908 all have a structure that is the same as controller 1000 described with respect to FIG. 10. Controllers 208, 408, 608, 808 and 908 are structured like controller and function like controller 1000. Controller 1000 is a generalized controller that can be used in any embodiment of the temperature regulation system.

FIG. 10 shows a generalized schematic of the controller 1000 in communication with temperature sensors 1004a-1004c, a plurality of heating pads 1006a-1006c, an environmental sensor 1008 and a motion sensor 1010. The temperature sensors 1004a-1004c are a representation of the temperature sensors from earlier embodiments. Heating pads 1006a-1006c are a representation of the heating pads from earlier embodiments. The environmental sensor 1008 and motion sensor 1010 are representations of the motion sensors and environmental sensors from earlier embodiments. The sensors shown in FIG. 10 are generic representations to illustrate operation of the generalized controller 1000. The functionality of the controller and interaction with the sensors and user device is applicable in any of the earlier embodiments described.

As shown in FIG. 10, controller 1000 comprises a logical unit 1022, such as a processor 1022, a memory unit 1024 and a power unit 1026. The controller 1000, in this example, is a microcontroller i.e. includes all components on a single chip or integrated circuit. The processor 1022 is a microprocessor that can process electronic commands. The processor 1022 can execute commands stored in the non-transitory computer readable memory unit 1024. The processor 1022 is preferably in the form of an integrated circuit. The memory unit 1024 comprises ROM 1028 and RAM 1030. The power unit 1026 includes one or more rechargeable batteries that are disposed in a casing and in communication with the processor. The controller 1000 also includes other essential electronic components for interfacing the various components described and appropriate interfacing circuitry.

The controller 1000 further includes a communication module 1032 which is functionally part of a controlling unit 1032, 1034. The communication module 1032 is low energy wireless system such as a Bluetooth module. The communication module 1032 is in wire or wireless communication with the processor 1022 and allows the controller 1000 to communicate with a user device 1016.

A local application that is executable on the user device 1016 allows communication between the user device 1016 and the controller. The application also allows for a user to access an interface that allows a user to input user parameters (as described earlier) as well as additionally modify controller operating modes.

The controller 1000 is also in communication with a plurality of temperature sensors and heating pads that are disposed on a wearable garment. The controller 1000 is configured to receive a temperature measurement from a temperature sensor. The temperature measurement relates to a skin temperature of the user. The controller 1000 is further configured compare the temperature measurement with a threshold temperature and activate a heating pad if the temperature measurement is less than the threshold temperature. The temperature measurement relates to the temperature at a portion of a user's body. The controller continuously receives temperature measurements. The controller 1000 deactivates the heating pad once the temperature measurement exceeds the threshold temperature. It should be noted that the temperature sensors described herein measure the skin temperature but alternative sensors can be used that allow other temperature measurements such as muscle temperature or core temperature and so on.

As disclosed in the earlier embodiments each temperature sensor is associated with a heating pad. The controller 1000 receives a plurality of temperature measurements, each temperature measurement being received from a single temperature sensor. The controller 1000 compares each temperature measurement with a threshold temperature. The controller 1000 activates the specific heating elements that are associated with the temperature sensors that detect a temperature measurement that is lower than the threshold temperature. The controller 1000 allows for localized or selective heating of specific portions of the user's body to heat.

Optionally in an operating mode, the controller 1000 may be configured to determine a temperature profile along the user's body. The temperature profile is a distribution of temperatures across or along the various portions of the user's body. The temperature profile can be transmitted to a user device 10 for display to the user to indicate which parts of the user's body are cooler. Temperature and heat distribution across each user is different, and various parts of a user's body cool at differing rates. The controller of the temperature regulation system detects such changes based on the temperature measurements from the various temperature sensors e.g. 1004a-1004c (or any of the sensor arrangements described earlier) to calculate the temperature or heat distribution profile on a user's body. The controller 1000 is advantageous because heat is applied to localized areas of the user's body that require further heating. One example could be in cold climates the extremities of a user's body cool more rapidly than the core of the user's body. The use of any one of the temperature regulation system embodiments disclosed and in particular the controller, allows the system to provide heat to the extremities of the user's body to heat them, thus reducing the physiological work needed to heat the user's extremities. This allows for more efficient blood flow in the user's body and reduced physiological work.

Optionally in a further operating mode the controller 1000 may also determine an average body temperature based on the various temperature measurements from temperature sensors 1004a-1004c. The average temperature may be a mean temperature value or a median temperature value. The average temperature value provides an indication of overall body temperature. The mean of the various temperatures may be the mathematical mean. The median of the various temperature measurements may be the mathematical median.

In at least one embodiment the mean temperature can be calculated based on weighted temperature measurements. In this alternative, each temperature measurement may be attributed a weighting. The weighting is in the form of a coefficient that is associated with each temperature measurement from each temperature sensor. The coefficient (i.e. weighting) is dependent on the location of the sensor on the user's body or the surface on the user's body. The controller 1000 is configured to assign an appropriate coefficient to each temperature measurement based on the location of the temperature sensor that has provided the temperature measurement. The controller may include a pre-determined mapping of the temperature sensor locations that is used to determine the location of the temperature measurement. In one example the temperature measurements from the user's extremities may be assigned a higher coefficient as compared to temperature measurements from the torso of the user's body. The coefficients may be reflective of thermal sensitivity of the user's skin i.e. a higher coefficient is assigned to locations that are more likely to have greater temperature fluctuations or locations that are likely to cool faster than other locations of the user's body. The coefficients assigned to temperature measurements may also be based on a thermal sensitivity measure as described, the thermal sensitivity acting as a further input. In a further alternative, the coefficients may be customized for each user based on initial user information such as which locations of the user are most susceptible to rapid thermal or temperature change.

The controller 1000 is configured to compare the average temperature with a threshold temperature. If the average temperature is less than the threshold temperature the controller activates all the heating pads 1006a-1006c to heat the user's body. All the heating pads 1006a-1006c are activated to the same intensity level.

The controller 1000 is configured to provide an activation signal along the power lines to the heating pads 1006a-1006c. The activation signal is preferably a pulse width modulated (PWM) power signal. The controller 1000 includes a PWM module 1034 which is functionally part of the controlling unit 1032, 1034. This PWM module 1034 can be integrated into the processor or connected to the processor and the power unit. The PWM module 1034 generates a PWM signal and transmits such along the power lines to the heating pads 1006a-1006c. A PWM signal conserves the power from the power unit.

A threshold temperature is determined by the controller 1000. The controller 1000 first determines a reference temperature. The reference temperature relates to a reference body temperature of the user. The reference temperature preferably relates to a reference skin temperature of the user. The reference temperature can be the initial or reference skin temperature of a portion of the user's body. The reference temperature is determined during a calibration process. The calibration process takes place during start-up of the system and takes place in a comfortable environment. A comfortable environment is an environment in which the user feels comfortable with respect to body temperature i.e. a thermally comfortable environment. This may be a subjective parameter i.e. comfort for each user varies. The user can initiate a calibration process by activating a push button on the controller 1000 or by selecting a calibration mode via the user device 1016.

The temperature regulation system as described is advantageous because the system determines a temperature distribution across a user's skin and selectively energizes or activates a heating pad in the location where the temperature is less than a threshold temperature. This is further advantageous because power consumption is reduced. Further the temperature regulation system as described is also advantageous because the system takes into account various factors or parameters that can affect a person's thermal comfort or sense of comfort. For example the system actively modifies the threshold temperature based on environmental parameters, movement of the user and specific user parameters such as age, gender and cold sensitivity.

FIG. 11 shows an embodiment of the calibration process 1100. The calibration process is an initial threshold setting process. At step 1101 an initial body temperature measurement is obtained by the controller from a temperature sensor. This initial body temperature measurement is stored by the controller. In one form the initial body temperature is an average body temperature based on the multiple temperature measurements from the multiple sensors 1004a-1004c (or other sensors described earlier). It should be noted that the body temperature is a skin temperature as described herein. Alternatively, the initial body temperature corresponds to the lowest temperature measurement value obtained by the controller 1000. In a further alternative embodiment, the temperature measurements may be provided as plurality or list of independent temperature measurements. The initial temperature may be measured for each body location. Preferably the controller is configured to record and store an initial temperature for each location on the body.

At step 1102 an initial ambient temperature measurement is obtained from the user device 1016 based on local weather information available at the user device 1016. The ambient temperature measurement is recorded and stored within the memory unit 1024. The controller 1000 can also record and store a time of day measurement. This ambient temperature measured in a comfortable environment can be set or stored as a base ambient temperature. Any changes in ambient temperature can be assessed in relation to the base ambient temperature by the controller to adjust the threshold temperature, as described later.

At step 1103 an initial relative humidity measurement is obtained by the controller 1000 from an environmental sensor 1008. The relative humidity relates to the humidity in the comfortable environment. The relative humidity measurement is stored within the memory unit 1024.

At step 1104 a plurality of fixed user parameters are obtained by the controller 1000. The fixed user parameters are unchanging parameters associated with the user. These parameters are most likely to remain unchanged for extended periods of time. At step 1104 the unchanging parameters gathered by the controller 1000 are gender, age, body surface area and cold sensitivity. The user enters age and gender into the user device 1016 as part of the calibration process. The age and gender information is stored within the memory unit 1024 of the controller 1000.

The body surface area is determined by the user based on the height and weight of the person. The body surface area is input via the user device 1016. Cold sensitivity is entered by the user via the user device 1016. Cold sensitivity is selected from a predetermined numerical scale, the scale being related to a thermal comfort scale. The user selects from −2, −1, 0, +1, +2, wherein −2 relates "not cold sensitive at all" and +2 relates to "very cold sensitive". This is a subjective measure and the user selects cold sensitivity parameter from the predefined scale.

At step 1105 the controller 1000 determines the threshold temperature by using the reference temperature labelled T herein. Below are examples of how the threshold temperature can be determined using the reference temperature and one or more of ambient temperature, initial relative humidity, user parameters. Preferably the controller 1000 determines a unique threshold temperature at each location on the user's body based on the above described parameters and individual initial temperature measurements.

In one example the threshold temperature is the reference temperature T minus 0.025° C. T−0.025° C. is considered the base threshold temperature, where there are no other sensors or parameters used. The embodiments of the temperature regulation system as described earlier include an environmental sensor, motion sensor and user parameters. Measurements or inputs from these can be used to adjust the threshold temperature.

The reference temperature T is adjusted based on one or more default parameters. The default parameters are any one or more of relative humidity, ambient temperature, cold sensitivity, age, gender and body surface area. The threshold temperature is determined based on the reference temperature and any one or more other parameters that are available to the controller.

Following is a description of the changes to the reference temperature to define a threshold temperature at step 1105. The reference temperature T is raised by 0.025° C. if the user is 60 or older, or the reference temperature T is lowered by 0.025° C. if the user is 59 or younger. The reference temperature is raised by 0.025° C. if the user is a man since men are better at retaining heat. The reference temperature is lowered by 0.025° C. if the user is a female because women are found to feel colder. The reference temperature is lowered by 0.025° C. if the body surface area is greater than 1.8 m².

The reference temperature T is also modified based on the cold sensitivity parameter in order to determine a threshold temperature. In one example if the cold sensitivity parameter is −2 or −1 then the reference temperature is raised by 0.025° C. If the cold sensitivity parameter is +1 or +2 then the reference temperature T is lowered by 0.025° C. If the cold sensitivity parameter is 0, then there is no change to the reference parameter.

The changes to the reference temperature are cumulative to determine a threshold temperature. The threshold temperature is determined as a sum of all the changes to the reference temperature based on one or more of the default parameters.

FIG. 12 shows a method 1200 of operation of the controller 1000 when in use. At step 1201 a threshold temperature is determined. The threshold temperature is determined using the method described with respect to FIG. 11. At step 1202 the controller receives temperature measurements from the one or more sensors 1004a-1004b of the temperature regulation system. As described, the sensors can be as per any one of the embodiments described earlier. At step 1203 the controller compares the temperature measurement with the threshold temperature. If the temperature measurement is less (i.e. YES) than the threshold temperature then at least one of the heating pads 1006a-1006c are energized, as per step 1204. The heating pad provides heat to the skin of the user's body when energized to increase the skin temperature of the user. If the temperature measurement is higher or greater than the threshold temperature then the method returns to step 1201. Following step 1204 the method returns to step 1201. The controller 1000 is configured to measure each temperature measurement and compare each temperature measurement with a unique corresponding threshold temperature. Each threshold temperature corresponds to a location on the user's body and each temperature measurement also corresponds to a location on the user's body. The controller 1000 selectively activates a heating pad that corresponds to a temperature sensor that measures a temperature less than a corresponding threshold temperature.

In its simplest form the threshold is considered to be the reference temperature T minus 0.025° C. (i.e. T−0.025). The controller 1000 is configured to compare the temperature measurement with the threshold temperature for at least one sampling period i.e. compare at least two consecutive temperature measurements. For example if the temperature measurement is less than the threshold for 2 seconds or for two or more consecutive measurements, then the method proceeds to step 1204. The controller 1000 is configured to determine the threshold temperature. The threshold temperature is determined by the controller for each user, i.e. each user will have a unique threshold temperature associated with a user.

The system can optionally adjust the threshold temperature during method 1200 based on one or more adjustment parameters. Adjustment parameters are one or more parameters measured by other sensors within the temperature regulation system such as an environmental sensor, a motion sensor. Adjustment parameters also include user parameters that can be entered by the user through the user device.

FIG. 12 further shows optional steps of method 1200 that are directed to the adjustment of the threshold temperature. Referring to FIG. 12 the method 1200 comprises an optional step 1205, in which, the controller determines if a relative humidity measurement is received. If NO, then the method proceeds to step 1202. If YES, the controller monitors change in humidity for at least a minute at step 1206. At step 1207 the controller determines if the humidity increases by 10% for 1 minute. If YES, then the controller proceeds to step 1208 to modify the threshold temperature by a predetermined value. If YES, at step 1207 the threshold temperature is lowered by 0.025° C. If the test at step 1207 results at NO, then the controller proceeds to step 1209. At step 1209 the controller determines if the relative humidity decreases by more than 10% for more than 1 minute. If YES, then the method proceeds to step 1208, where the threshold temperature is modified, i.e. the threshold temperature is increased by 0.025° C. If NO at step 1209 then the threshold temperature is not changed and the optional method returns to step 1202.

The method 1200 comprises an optional step 1210, in which, the controller 1000 determines if a movement measurement is received from a motion sensor. If step 1210 returns a YES, the controller monitors movement of the user at step 1211. As described earlier the motion sensor determines movement of the user i.e. speed of the user. Additionally, or alternatively the motion sensor can also detect a heart rate of the user. At step 1211 the controller determines if the movement increases by more than 10% for more than 1 minute or the speed of the user increases by more than 10% for more than 1 minute or the heart rate increases by more than 10% for more than 1 minute. If YES, then the method proceeds to step 1208 to modify the threshold temperature by a modified or predetermined value. The modifier or predetermined value is 0.035° C., and the threshold temperature is decreased by 0.035° C. This is because users can tolerate a skin temperature that is colder skin temperatures when exercising because the deep body temperature of the user increases with movement. The motion sensor can be an accelerometer as described earlier and allows the controller 1000 to determine the intensity and duration of the movement of the user. If at 1211, the method determines a NO output, then the method can proceed to the next optional step or directly to step 1202, and the threshold temperature is not modified or adjusted. In general, the threshold temperature is reduced if the relative humidity increases as user's feel colder in high humidity weather. Therefore, the controller is configured to activate the heating pad at a lower temperature to account for the perception of a colder temperature. The heating pad needs to be activated earlier to prevent the user from feeling too cold. The threshold temperature is an activation temperature, at which the heating pad is activated.

Alternatively, the threshold temperature can be increased if the humidity is increased, such that the heating pad is activated at a higher temperature. The threshold temperature can be increased if the humidity increases depending on specific user parameters such as age, gender or thermal sensitivity. For example, if the user is not very thermally sensitive then the controller is configured to raise the threshold temperature when the humidity increases, since the user does not feel overly cold.

The method includes a further optional step 1212, in which, the controller 1000 determines if an ambient temperature is received from an environmental sensor. Ambient temperature is an environmental measurement. If step 1212 returns a YES, the controller determines ambient temperature at step 1213. At step 1213 the controller determines if the ambient temperature is greater than 25° C. If YES the method proceeds to step 1208 to modify the threshold temperature by a modifier or a predetermined value. The predetermined value is 0.025° C. If at step 1213 the method returns a NO, the method proceeds to step 1214. At step 1214 the controller determines if the ambient temperature is less than 15° C. If YES, then the method proceeds to step 1208 and the threshold temperature is reduced by 0.025° C. If NO, then the method proceeds to step 1202 (not illustrated for clarity).

In an alternative embodiment, the threshold temperature is increased if the ambient air temperature increases above a base ambient temperature. For example, if the base ambient temperature is 20° C., and the measured ambient air temperature is above 25° C. the threshold temperature is raised by 0.025° C. If the measured ambient air temperature is above 30° C. the threshold temperature is raised by 0.025° C. If the ambient air temperature is above 35° C. the threshold temperature is raised by 0.025° C. Conversely if the ambient air temperature is less than 15° C. the threshold temperature is reduced by 0.025° C. If the ambient air temperature is less than 10° C. the threshold temperature is reduced by 0.025° C. If the ambient temperature is less than 5° C. the threshold temperature is reduced by 0.025° C.

In an alternative embodiment, the threshold temperature may be modified in a cumulative manner if the ambient air temperature is greater or less than the base ambient temperature. For example, in this embodiment the base ambient temperature is 20° C. If the ambient air temperature is above 25° C. the threshold temperature is raised by 0.025° C. If the ambient air temperature is above 35° C. the threshold temperature is raised by 0.025° C., meaning the threshold temperature is raised by a total of 0.05° C. If the ambient air temperature is above 35° C. the threshold temperature is raised by 0.025° C., meaning the threshold temperature is raised by a total of 0.075° C. The threshold temperature is cumulatively increased by the modifier. In this example the threshold temperature is increased by 0.025° C. every time the ambient temperature is increased by 5° C., once the ambient temperature exceeds the base ambient temperature. The threshold temperature may not be changed if the ambient temperature is less than or drops below the base ambient temperature. Alternatively, the threshold temperature can be reduced by a modifier of 0.025° C. every time the ambient temperature is reduced by 5° C. following a reduction compared to a base ambient temperature. This will mean that in an example operation, if a user is comfortable with a skin at 32° C., when the humidity is at 50%. If the skin cools to 30° C., the heating pads may be activated. If the detected humidity increases from 50 to 80%, the pads may also be activated when the skin cools from 32 to 31° C. This is so as to achieve a desirable outcome as users tend to feel colder when humidity is higher when air temperature remains constant.

In an alternative embodiment the controller is configured to increase the threshold temperature if the ambient air temperature increases above a base ambient temperature, such as for example 25° C. The threshold temperature (i.e. the activation temperature of the heating pads) is increased by 0.025° C. If the ambient air temperature is increased above 30° C., then the controller is configured to raise the threshold temperature by 0.025° C. If the ambient air temperature increases above 35° C., the controller is configured to increase the threshold temperature (i.e. the activation temperature) by 0.025° C. The base ambient temperature can be the ambient temperature measured during the threshold setting process 1100 described with respect to FIG. 11. The initial ambient temperature measured while measuring the reference body temperatures is measured in a comfortable environment, hence is a good measure of a base ambient temperature. However, if the ambient temperature is less than a base ambient temperature for example less than 15° C. the controller is configured to maintain the threshold temperature. This is because the in light of the cooler ambient air temperature, the user's body temperature will reduce, and hence the heating pads will be activated at a pre-set threshold time. This embodiment provides a safety mechanism that the heating pads are not energized too early when the ambient air temperature is below a base ambient temperature, and potentially providing too much heat to the user.

In some examples, if the humidity and motion measurement are detected to have changed during a predetermined period of time, a modifier may be generated with respect to this change in humidity and motion. This modifier may then be used as a weighting or otherwise an adjustment variable which can in turn be used to adjust the threshold to the appropriate amount.

The method may further proceed to optional step 1215, in which, the controller 1000 determines if a time of day information is received from a user device. If step 1215 returns YES, the controller determines a time of day at step 1216. Following the determination of the time of day, the method proceeds to step 1208 wherein the threshold temperature is modified or adjusted. The rate of threshold adjustment is based on different time of day determination that occurs at step 1216. One example of the threshold temperature modifier determination is explained below, as would occur at step 1216. If the time of day is between 10:00-11:59 or between 22:00 to 23:59, the threshold temperature is increased by 0.025° C. If the time of day is determined to be between 12:00 and 21:59 the threshold temperature is increased by 0.035° C. If the time of day is between 00:00 and 9:59 the threshold temperature is reduced by 0.025° C. because this time is considered the coldest time of the day. The threshold temperature parameter adjustment as described is advantageous it aligns with the circadian rhythm of humans in general. It is known that the body temperature (i.e. internal body temperature) is lower during the night than it is during the day. Therefore, the same level of thermal comfort may be achieved in the afternoon for a lower skin temperature, and vice versa. The changes in threshold temperature (i.e. threshold temperature modifier) calculation as described is in alignment with the circadian rhythm of a user hence providing for added comfort.

At step 1208 a final threshold temperature is determined. The method proceeds to step 1203 to compare the temperature measurement with a threshold temperature, wherein the threshold temperature is the updated or modified threshold temperature determined at step 1208.

The threshold temperature is modified in a cumulative manner based on the various modifier values or predetermined values described above. The threshold temperature is adjusted by a cumulative value based on the number of adjustment parameters used.

The method comprises an additional step 1217 that proceeds after step 1212 wherein the ambient temperature measurement is received by an environmental sensor. At step 1217 the controller determines if the ambient air temperature is reducing by 0.5° C. for at least a period of time e.g. for at least 1 minute. Such a change in air temperature is a determination of a cold air event. If a change in air temperature as described occurs, then the method proceeds to 1218 where the heating pad is activated continuously for a period of time e.g. 2 minutes or until a temperature measurement detected has increased by 0.1° C. for at least 1 minute. Step 1218 is a "super mode". A user can select activation of the super mode by using a button on the controller 1000 or by selecting such an option on the user device 1016.

Additional optional steps for other adjustment parameters can be implemented. As disclosed in FIG. 12, the threshold temperature is customized for each user. The threshold temperature can also be updated in real time as changing environmental measurements are identified or as a change in a motion measurement is detected or as user parameters are updated automatically or by the user. Real time updating of the threshold temperatures and customized threshold temperatures are advantageous because the system continuously determines the most comfortable temperature for the user (i.e. the threshold temp) and attempts to control the heating elements such that the user is not cold or the user's skin temperatures are not less than the threshold temperature.

It will be appreciated that in the exemplary embodiments described earlier, the locations of the temperature sensors and heating pads are described with reference to major muscle groups in the human body. It will be appreciated that in alternative embodiments the temperature sensors and/or the heating pads can be aligned with any suitable portion of the human's body. For example, the heating pads and/or the temperature sensors can be placed on the wearable garment such that in use, the heating pads and/or the temperature sensors are aligned with major tendons or major veins of the user. In some embodiments, a heating is positioned at least along the spine of the user since the spine carries all the major nerves of the user and is a sensitive part of the body.

It will be appreciated that the heating pads as described in the exemplary embodiments can be any suitable size and shape. The size and shape can be determined by the size of the wearable garment and the specific location the heating pad should align with in use. The heating pads are preferably a polygon shape. However other customized shapes are also contemplated. It will also be appreciated that the temperature sensors can be any suitable size, shape and resolution. It will also be appreciated the temperature sensors may be configured with any required sampling frequency.

In a further alternative embodiment the controller of the temperature regulation system is configured to receive a plurality or list of independent temperature measurements from each temperature sensor. The controller is configured to determine an initial body temperature corresponding to each location on the body. A threshold temperature can be calculated for each location on the body based on any one or more measurements/parameters as described earlier, such as an environmental measurement/parameter, a motion measurement or one or more user parameters. The controller is configured to compare each temperature measurement with a unique threshold temperature and activate each heating pad independently based on the comparison. Each heating pad is independently activated if the temperature measurement is less than the threshold temperature. The heating pad that is independently activated corresponds to the temperature sensor at a specific location on the user's body. In this alternative embodiment, the controller is configured to independently control each heating pad to independently heat a specific portion of the user's body based on unique or individual temperature sensor measurements. This alternative embodiment is advantageous because the entire body is heated, and specific heating pads are activated, which conserves power and provides heat where required, making the user more comfortable.

In yet another further embodiment of the disclosure, the temperature regulation system may be arranged to operate with a temperature adjustment element which includes a heating element as described above and/or a cooling element. When operating with a cooling element, similar operational logic described with reference to the controller above may apply, although modifications to operate with a cooling element with different threshold calculations may be used. Cooling elements, including, but not limited to piezoelectric cooling systems, heat pumps or transfer systems including heat sinks, fans or radiators may also be used. These embodiments may be advantageous in alternative environments where it would be desirable to achieve a cooling effect over that of a heating effect.

The above description has been directed to specific embodiments of this invention which is, however, not limited to these embodiments described for purpose of example only. It will be apparent for the man of the art that other variations and modifications may be made to the described embodiments, with obtaining some or all of their advantages. Therefore, it is the object of the appended claims to cover all such variations and modifications.

In particular, the invention concerns not only a temperature regulation system for regulating the temperature of a portion of a human or animal user's body, but more generally the for regulating the temperature of a portion of a any other body such as a recipient for receiving food or a liquid.

Also, the above description not only relates to comparing a temperature measurement or a change of rate of temperature, with a threshold temperature or threshold change of rate, but more generally to comparing any instant temperature related value with a corresponding temperature related threshold value.

Besides, the above description relates to a controller, comprising a logical unit, a memory unit and controlling unit, in communication with the temperature sensors, the heat adjustment elements, and the user device. Alternatively, the memory unit may be part of one of the temperature sensors or of the user device, and the logical unit may be part of the user device.

Also, the above description relates to examples where the system is integrated to a wearable garment for a user, human or animal. But it extends to a system integrated or part of an accessory such as a belt, a wrist lace or a watch, a shoe, etc. . . .

The invention claimed is:

1. A temperature regulation system for regulating the temperature of a body, the temperature regulation system comprising:
at least one temperature sensor adapted to generate a temperature measurement that relates to a temperature of a given portion of a body;
at least one flexible support to be directly or indirectly positioned against or in proximity of a given portion of the body;
at least one temperature adjustment element adapted to provide heat or cold or both heat and cold to a given portion of the body, arranged on or in the flexible support;
a memory unit adapted to store at least one temperature related threshold value;
a logical unit in wire or wireless communication with the memory unit and adapted to perform logical processing;
a controlling unit in wire or wireless communication with the logical unit, with the at least one temperature sensor and with the at least one temperature adjustment element;
the controlling unit being configured to:
receive the instant temperature of a given portion of the body from the temperature sensor and to transmit it to the logical unit,
receive from the logical unit a result of comparison between at least one instant temperature related value and the temperature related threshold value performed by said logical unit,
activate the at least one temperature adjustment element to provide heat or cold to a given portion of the body when said result of comparison is such that the instant temperature related value is equal or below, respectively equal or above, the temperature related threshold value,
wherein the controlling unit is further configured to receive one or more reference temperatures of a given portion of the body measured by the at least one temperature sensor prior to receiving the instant temperature and to transmit said reference temperatures to the logical unit, and the logical unit is further configured to determine the temperature related threshold value based on said reference temperatures and to store it in the memory unit.

2. The temperature regulation system in accordance with claim 1, wherein the memory unit is part of the controlling unit or of the temperature sensor or of an external portable device.

3. The temperature regulation system in accordance with claim 1, wherein the logical unit is part of the controlling unit or of an external portable device.

4. The temperature regulation system in accordance with claim 1, wherein the controlling unit is further configured to deactivate the at least one temperature adjustment element when the result of comparison is such that the instant temperature related value is equal or exceeds, respectively is equal or below, the temperature related threshold value.

5. The temperature regulation system in accordance with claim 1, wherein the controlling unit is further configured to deactivate the at least one temperature adjustment element after a given of time of working of at least one temperature adjustment element.

6. The temperature regulation system in accordance with claim 1, further comprising one or more other temperature sensors adapted to generate a temperature measurement that relates to a temperature of other portions of the body, said other temperature sensors being arranged on or in the flexible support or other flexible supports to be directly or indirectly positioned against or in proximity of the other portions of the body, and wherein the controlling unit is further configured to:
receive one or more other reference temperatures of the other portions of the body measured by the other temperature sensor and to transmit said reference temperatures to the logical unit, and the logical unit is further configured to determine the temperature related threshold value or a temperature related threshold value for each of the given and other portions of the body, based on said reference temperatures and to store them in the memory unit,
receive the instant temperature of said other portions of the body from said other temperature sensors and to transmit them to the logical unit,
receive from the logical unit a result of comparison between instant temperature related values, related to the respective instant temperatures of the other portions of the body, and the temperature related threshold value, or the corresponding other temperature related threshold values, performed by said logical unit,
deactivate the at least one temperature adjustment element when the result of comparison is such that the instant temperature related values, related to the other portions of the body, are equal or exceeds, respectively is equal or below, the temperature related threshold value or the corresponding other temperature related threshold values.

7. The temperature regulation system in accordance with claim 6, wherein the body is the body of a human or animal user, and the given portion of the body is one of the wrists of the body of the user.

8. The temperature regulation system in accordance with claim 1, wherein the at least one temperature adjustment element is a plurality of temperature adjustment elements adapted to provide heat or cold or both heat and cold to different portions of the body, the controlling unit being in wire or wireless communication with each of the temperature adjustment elements, wherein the logical unit is further configured to determine a corresponding threshold temperature related threshold value associated with each of the different portions of the body based on said reference temperature and to store them in the memory unit, and wherein the controlling unit is further configured to receive from the logical unit a result of comparison between the instant temperature related values of each of the different portions of the body and the corresponding temperature related threshold value performed by said logical unit, and to activate a temperature adjustment element amongst the plurality of temperature adjustment elements, to provide heat or cold to the corresponding portion of the body when the instant temperature related value is equal or below, respectively equal or above, the corresponding temperature related threshold value.

9. The temperature regulation system in accordance with claim 8, wherein the plurality of temperature adjustment elements is arranged on or in the flexible support.

10. The temperature regulation system in accordance with claim 8, further comprising a plurality of flexible supports to be directly or indirectly positioned against or in proximity of a portion of the body, each of the temperature adjustment elements being arranged on or in one of the flexible supports, at least one of the temperature adjustment elements being arranged on or in a flexible support different from the flexible supports which the other temperature adjustment elements are arranged on or in.

11. The temperature regulation system in accordance with claim 8, wherein the at least one temperature sensor is a plurality of temperature sensors adapted to generate a temperature measurement that relates to respective temperatures of the different portions of the body, the controlling unit being in wire or wireless communication with each of the temperature sensors and being configured to
receive one or more reference temperatures of each of the different portions of the body measured by the corresponding temperature sensors, and transmit said reference temperatures to the logical unit, said logical unit being further configured to determine the corresponding temperature related threshold values based on said respective reference temperatures and to store them in the memory unit,
receive the respective instant temperatures of the different portions of the body from the respective temperature sensors, and to transmit them to the logical unit,
receive from the logical unit results of comparison between each of the instant temperature related values and the corresponding temperature related threshold values performed by said logical unit,
activate the corresponding temperature adjustment element to provide heat or cold to the corresponding portions of the body when corresponding results of comparison are such that the corresponding instant temperatures related values are equal or below, respectively equal or above, the corresponding temperature related threshold values.

12. The temperature regulation system in accordance with claim 1, wherein the flexible supports are parts of a wearable garment configured to be worn by a human or animal user, the temperature sensors and the temperature adjustment elements being directly or indirectly positioned in an operable position against or in proximity of the skin of a portion of the user's body.

13. The temperature regulation system in accordance with claim 12, wherein, in use, the temperature adjustment elements or temperature sensors or both are positioned at least one of the following ways:
(a) directly or indirectly against or in proximity of a forearm of the user,
(b) directly or indirectly against or in proximity of an arm of the user, (c) directly or indirectly against or in proximity of the abdomen of the user, (d) directly or indirectly against or in proximity of the chest of the user, (e) directly or indirectly against or in proximity of the back of the user, (f) directly or indirectly against or in proximity of the thigh of the user, (g) directly or indirectly against or in proximity of a lower leg of the user, (h) directly or indirectly against or in proximity of a finger of the user, (i) directly or indirectly against or in proximity of a hand of the user, (j) directly or indirectly against or in proximity of the head of the user, (k) directly or indirectly against or in proximity of the neck of the user, (l) directly or indirectly against or in proximity of a toe of the user, (m) directly or indirectly against or in proximity of the foot of the user (n) directly or indirectly against or in proximity of a shoulder of the user, (o) directly or indirectly against or in proximity of a lower arm of the user, and (p) directly or indirectly against or in proximity of an upper arm of the user.

14. The temperature regulation system in accordance with claim 1, wherein the system further comprises at least one environmental sensor that is configured to measure the value of an environmental parameter, the controlling unit being in wire or wireless communication with the environmental sensor, and being configured to receive a measured value of the environmental parameter and to transmit it to the logical unit, said logical unit being configured to adjust the temperature related threshold values based on the value of the environmental parameter.

15. The temperature regulation system in accordance with claim 1, wherein the system further comprises at least one motion sensor, such as an accelerometer, configured to measure the value of a motion parameter that relates to a motion of the user, the controlling unit being in wire or wireless communication with the motion sensor, and being configured to receive the value of the motion parameter and to transmit it to the logical unit, said logical unit being configured to analyze the user's activity and adjust the temperature related threshold values based on the value of the motion parameter.

16. The temperature regulation system in accordance with claim 15, wherein the temperature related threshold values are related to the value of the motion parameter, such that the greater the value of the motion parameter the lower the temperature related threshold values.

17. The temperature regulation system in accordance with claim 1, wherein the controlling unit is further configured to receive the value of at least one user parameter and to transmit it to the logical unit, said logical unit being configured to adjust the temperature related threshold values based on the value of the user parameter.

18. The temperature regulation system in accordance with claim 17, wherein the user parameter is at least one or more of age, gender, personal thermal sensitivity, body height, body mass, cold habituation/acclimation, acute weakness, time of day, season.

19. The temperature regulation system in accordance with claim 1, wherein the controlling unit is configured to at least periodically update the temperature related threshold values based on user data.

20. The temperature regulation system in accordance with claim 1, wherein the controlling unit is configured to at least periodically update the temperature related threshold values based on collected on a group of users.

21. The temperature regulation system in accordance with claim 1, wherein the controlling unit is configured to communicate wirelessly with an external device.

22. The temperature regulation system in accordance with claim 1, wherein each of the temperature adjustment elements include a heating element or a cooling element or both a heating element and a cooling element.

23. The temperature regulation system in accordance with claim 1, further comprising a power supply for supplying power to the controlling unit and the logical unit.

24. The temperature regulation system in accordance with claim 23, wherein the power supply is an external power supply.

25. The temperature regulation system in accordance with claim 1, wherein the controlling unit is configured to receive periodically the temperatures from the temperature sensors, every X minutes, preferably with X less or equal to 5.

26. The temperature regulation system in accordance with claim 1, wherein the controlling unit and the temperature sensors are configured such that the temperature from each of the temperature sensors is received by the controlling unit in a time lapse of 1 to 5 seconds.

27. The temperature regulation system in accordance with claim 1, wherein the at least one temperature related threshold value is a threshold temperature, and the at least one instant temperature related value is the instant temperature.

28. The temperature regulation system in accordance with claim 1, wherein the at least one, or a second, temperature related threshold value is a threshold of rate of change of temperature over a given period of time, and the at least one, or second, instant temperature related value is the rate of change of the instant temperature over said given period of time.

29. The garment to be worn by a human or animal user comprising the temperature regulation system in accordance with claim 1, the flexible supports being parts of, or integrated in, the garment.

* * * * *